United States Patent [19]

Redmann et al.

[11] Patent Number: 5,633,993
[45] Date of Patent: May 27, 1997

[54] METHOD AND APPARATUS FOR PROVIDING A VIRTUAL WORLD SOUND SYSTEM

[75] Inventors: William G. Redmann, Oak Park, Ill.; Kerry M. Perkins, Simi Valley, Calif.

[73] Assignee: The Walt Disney Company, Anaheim, Calif.

[21] Appl. No.: 16,114

[22] Filed: Feb. 10, 1993

[51] Int. Cl.$^6$ .................................................. G09B 9/00
[52] U.S. Cl. ........................................ 395/119; 381/61
[58] Field of Search .................... 395/119; 381/17, 381/18, 61; 434/307, 307 R; 273/317.1

[56] References Cited

U.S. PATENT DOCUMENTS

| | | | |
|---|---|---|---|
| 4,196,528 | 4/1980 | Foerst | 434/61 |
| 4,574,391 | 3/1986 | Morishima | 381/18 |
| 4,781,594 | 11/1988 | Metcalf | 434/48 |
| 4,948,371 | 8/1990 | Hall | 434/21 |
| 4,952,024 | 8/1990 | Gale | 359/477 |
| 5,046,097 | 9/1991 | Lowe et al. | 381/17 |
| 5,265,166 | 11/1993 | Madnick et al. | 381/27 |
| 5,272,757 | 12/1993 | Scofield et al. | 381/25 |
| 5,280,479 | 1/1994 | Mary | 370/85.6 |
| 5,315,057 | 5/1994 | Land et al. | 84/601 |
| 5,322,441 | 6/1994 | Lewis et al. | 434/307 R |
| 5,337,363 | 8/1994 | Platt | 381/17 |
| 5,385,851 | 1/1995 | Fujimori | 381/17 |

FOREIGN PATENT DOCUMENTS

| | | |
|---|---|---|
| 047605 | 4/1992 | European Pat. Off. . |
| 0479604 | 4/1992 | European Pat. Off. . |
| WO92/09921 | 6/1992 | WIPO . |

*Primary Examiner*—Heather R. Herndon
*Assistant Examiner*—Rudolph Buchel
*Attorney, Agent, or Firm*—Fish & Neave; Mark D. Rowland

[57] ABSTRACT

A method and system are provided which allow sounds emanated by objects in a viewer-interactive, computer-generated graphic virtual world, and other virtual world sounds (e.g., a music score), to be reproduced using flexibly and automatically scheduled resources of a virtual world sound system. Sound system resources are allocated in accordance with priority values associated with sounds, sound-emanating objects or requests for sound channel allocation.

17 Claims, 8 Drawing Sheets

SOUND DATA ARRAY

| SOUND ID# | MIDI NOTE | CHANNEL | DURATION | OUTPUT # | VOLUME | RELATIVE VOLUME | PITCH CONTROL VALUE |
|---|---|---|---|---|---|---|---|
| 1 | C2 | 2 | 60 | 8 | 127 | −50 | 2000H |
| 2 | | | | | | | |
| 3 | | | | | | | |
| . | | | | | | | |
| . | | | | | | | |
| . | | | | | | | |
| n | | | | | | | |

200

METHOD AND APPARATUS FOR PROVIDING A VIRTUAL WORLD SOUND SYSTEM

BACKGROUND OF THE INVENTION

This invention relates to a method and system for reproducing sounds in an interactive virtual world environment.

"Virtual reality" is the experience of living or playing in a computer-generated environment which models a three-dimensional ("3-D") virtual space (i.e., a virtual world). In virtual reality systems, a viewer typically dons a set of goggle-mounted video screens or some other form of head-mounted display ("HMD"), and an audio headset, to block out the real world. Typically, the HMD is a conventional pixel (picture element) based, raster scan video display device. The viewer might also be provided with a simulated laser gun, a vehicle with accelerator and brake pedals, or some other device coupled to the computer system to enable the viewer to move about in, interact with or otherwise influence objects and characters in the virtual world. Sounds emanating from the virtual world (such as lasers firing or vehicles accelerating) are reproduced by speakers in the viewer's headset or by external speakers.

On the HMD the viewer sees images of virtual world scenes that are generated from a 3-D model of the virtual world by a computer graphic system. The scenes are displayed to the viewer as they appear from a specific position and orientation in the virtual world, called the "viewpoint" or "eyepoint." Usually, the viewer is given some degree of control over the position and orientation of the viewpoint, thus allowing the viewer to see different images from a plurality of different viewpoints.

By enabling the viewer to change the position and/or orientation of his or her viewpoint, the computer graphic system can create the illusion of the viewer "travelling" through the virtual world and looking in all directions. Depending on the capabilities and programming of the system, the viewer might be allowed to "travel" without restriction above, below and around a scene, as well as into or through structures, as though the viewer could fly or had other capabilities. The system might also be designed to constrain the motion of the viewpoint in various ways to achieve realism. For example, the viewer might only be allowed to position and orient the viewpoint no closer than six feet from the ground to simulate a view of the virtual world from the vantage of a person standing on the ground in the world. Alternatively or in addition, the viewpoint might be constrained from passing through the image of a solid surface (such as the wall of a building)—just as it is typically impossible in the real world to walk through the wall of a building. Also, the viewer might be constrained to move along a defined path, as though traveling on a train, such that a series of events can be enacted as the viewer's train passes by predetermined positions in the virtual world.

Virtual reality systems have developed from traditional military and commercial airline flight simulators, and military tank simulators, in which computer graphic systems render a simulated, 3-D world from the perspective of a person looking out of an aircraft cockpit window or tank turret (i.e., the system's "viewpoint"). The world created by such simulators typically includes static structures and terrain (e.g., an airport with runways and buildings situated in a world including lakes, rivers and mountains), and moving objects (e.g., flying aircraft, land vehicles and clouds). The images of the simulated world displayed on the "windows" of the cockpit or turret continually change—as might occur in the real world—in response to changes in position and attitude of the aircraft or vehicle being "flown" or "driven" by the person participating in the simulation.

Virtual reality systems have applicability in the entertainment industry. Computer games and arcade machines presenting a virtual reality experience as a form of entertainment can provide a viewer with a high level of enjoyment. Virtual reality systems can immerse a viewer in a realistic world, or a highly fantasized or magical one where even the laws of physics have been skewed, to produce an entertainment experience available by no other means.

Prior 3-D virtual reality systems, however, have suffered from a number of drawbacks that limit the virtual experience in ways that are particularly detrimental to the use of such systems to produce high-quality entertainment. One such drawback is the inability of such systems to immerse the viewer in a richly detailed 3-D auditory illusion which complements the visual illusion of the 3-D graphic virtual world.

Providing such a richly detailed 3-D auditory illusion requires a method and system capable of generating a large number of sounds and delivering those sounds in a three-dimensional space surrounding the viewer. Because the viewer can change position and orientation in the virtual world relative to other virtual world objects, including objects representing sound sources in the virtual world, a method and system which is capable of adjusting a richly detailed auditory illusion in real time as a function of the viewer's position and orientation in the virtual world would be preferred, particularly one that can give a viewer the impression that sound sources are localized as in the real world.

Some 3-D computer graphics systems that are known today incorporate a real time spatial sound processor for manipulating select monophonic audio signals so that they are perceived by a viewer wearing stereo earphones as sounds originating from sources located at predetermined positions in a 3-D virtual space. In these systems, the perceived positions of the sound sources are coordinated with the positions of graphic objects in the virtual world. The viewer thus perceives that the sounds are coming from the objects at their positions in the virtual world. Yet these systems provide only a relatively simple auditory environment. They lack mechanisms for managing a complex 3-D auditory presentation involving viewer movement, changing virtual world scenes and viewer interaction such as would be desirable for producing high quality entertainment.

The current per-channel cost of real time spatial sound processors makes them impractically expensive for reproducing a large number of separately localized sounds simultaneously. However, a realistic 3-D audio illusion can be provided in a virtual reality system without requiring that each sound which contributes to the audio environment of the virtual world be specifically localized to a particular 3-D position by a spatial sound processor. A few key sounds can be localized while other less important sources in the environment are reproduced using less expensive non-localized techniques. By appropriately selecting the sounds that are localized, the lack of localization for other sounds in the environment can be disguised. For instance, the playing of a non-localized sound of a door opening simultaneously with a localized sound of a door knob turning may lead a viewer to believe that both sounds are localized, especially if an effect such as reverberation is added to the non-localized sound to provide dimension.

Even so, complex virtual reality systems may make unpredictable demands on a complementary sound system. Although the events that take place in a virtual world created by a virtual reality system are generally each pre-planned and scripted, the scripting may allow spontaneous changes in the arrangement of those events, or in the events themselves, to be induced by movements and actions of the viewer. Thus, the number and nature of the sounds required for a particular virtual world scene may vary depending on viewer movement and interaction or some other not-fully predictable factor. For such systems a flexible scheduling mechanism which functions automatically to control the generation and delivery of sounds in accordance with current virtual world events may be required.

The demands made of the sound system may occasionally exceed its capacity to generate and deliver sounds in a desired manner, or at all, as may happen for example if a viewer's actions cause an unexpectedly large number or an unexpected combination of virtual world events to take place simultaneously, or if cost restraints preclude the system designer from incorporating optimum resources in the sound system. For example, by design or accident a virtual world scene might have more key sounds to be localized simultaneously than the number of available spatial sound processor channels. Likewise, the total number of sounds to be generated simultaneously may exceed the number of sound generator channels available. Some of these sounds may be more important to the virtual world scene than others. Thus it may be required that the resources of the sound system be allocated in a prioritized manner to increase the likelihood that an important sound will not be denied a sound generator channel or an appropriate sound delivery channel (e.g., a channel of a spatial sound processor).

In view of the foregoing, it would be desirable to be able to enhance a computer-generated, graphic virtual world environment with a complementary auditory environment provided by a virtual world sound system that implements a flexible and automatic resource scheduling method and system capable of interacting with the viewer.

It would also be desirable to be able to provide in such a sound system a prioritized resource allocation method and system to increase the likelihood that an important sound is allocated appropriate sound system resources in accordance with a desired manner of playback.

SUMMARY OF THE INVENTION

It is an object of the present invention to provide a method and system which allows sounds emanated by objects in a viewer-interactive, computer-generated graphic virtual world, and other virtual world sounds (e.g., a music score), to be reproduced using flexibly and automatically scheduled resources of a virtual world sound system.

It is another object of the present invention to provide such a method and system in which sound system resources are allocated in accordance with priority values associated with sounds, sound-emanating objects or requests for sound channel allocation.

In accordance with these and other objects of the present invention, a method and system are disclosed for flexibly and automatically scheduling the delivery of 3-D localized sounds emanating from a first number of virtual world objects (or logical channels) over a second number of 3-D physical sound channels, where the number of 3-D physical sound channels is less than the number of objects. For each of the number of objects, a sound channel request is made before the object is to emanate a sound, at which time the method and system determines whether a 3-D physical sound channel is available for delivering the sound to be emanated by the object. In response to a determination that a 3-D physical sound channel is available, the physical sound channel is allocated to the object. If no such channels are determined to be available for an object, an available non-localized physical sound channel is instead allocated to the object, which allows the object's sound to be delivered to the viewer without 3-D localization. If no such non-localized channel is available, the request to deliver the sound is unfulfilled, although the sound channel request may be subsequently re-executed after a localized or non-localized sound channel has become available.

Further in accordance with the present invention, a method and system are disclosed for assigning different priorities to one or more of sounds, objects and sound channel requests to increase the likelihood that an important sound (e.g., a sound emanating from an off-screen object or from a particular virtual world character or a sound that triggers a desirable psychoacoustic effect) will be delivered over a 3-D physical sound channel for proper localization by the viewer. The availability of a physical sound channel then is made a function also of the priority of the sound, object or request for a physical sound channel, or of a combination of such priorities, as compared with the priority of sounds, objects or requests, or combinations thereof, presently allocated such channels. A 3-D physical sound channel thus will be allocated to a high-priority sound, object, or channel request even when no such channel would otherwise be available.

Various exemplary prioritization schemes are disclosed, including prioritization schemes based on modifiable priority values assigned to stored sound samples, logical channels associated with virtual sound-emanating objects, and/or requests to allocate a physical sound channel to a logical channel, as well as an adaptive prioritization scheme based on the relative proximity of objects in the virtual world to the viewer's viewpoint.

The prioritization method and system of the present invention can be extended for use in allocating other portions of a virtual world sound system, including non-localized physical sound channels and sound generator channels. Sound system resources used to generate and deliver virtual world sounds other than those emanating from specific objects, such as a background music score, also can be scheduled and allocated in accordance with principles of the present invention.

BRIEF DESCRIPTION OF THE DRAWINGS

A complete understanding of the invention and its advantages may be gained from consideration of the following detailed description, taken in conjunction with the accompanying drawings, in which like reference characters refer to like parts throughout, and in which.

DETAILED DESCRIPTION OF THE INVENTION

Figure 1:
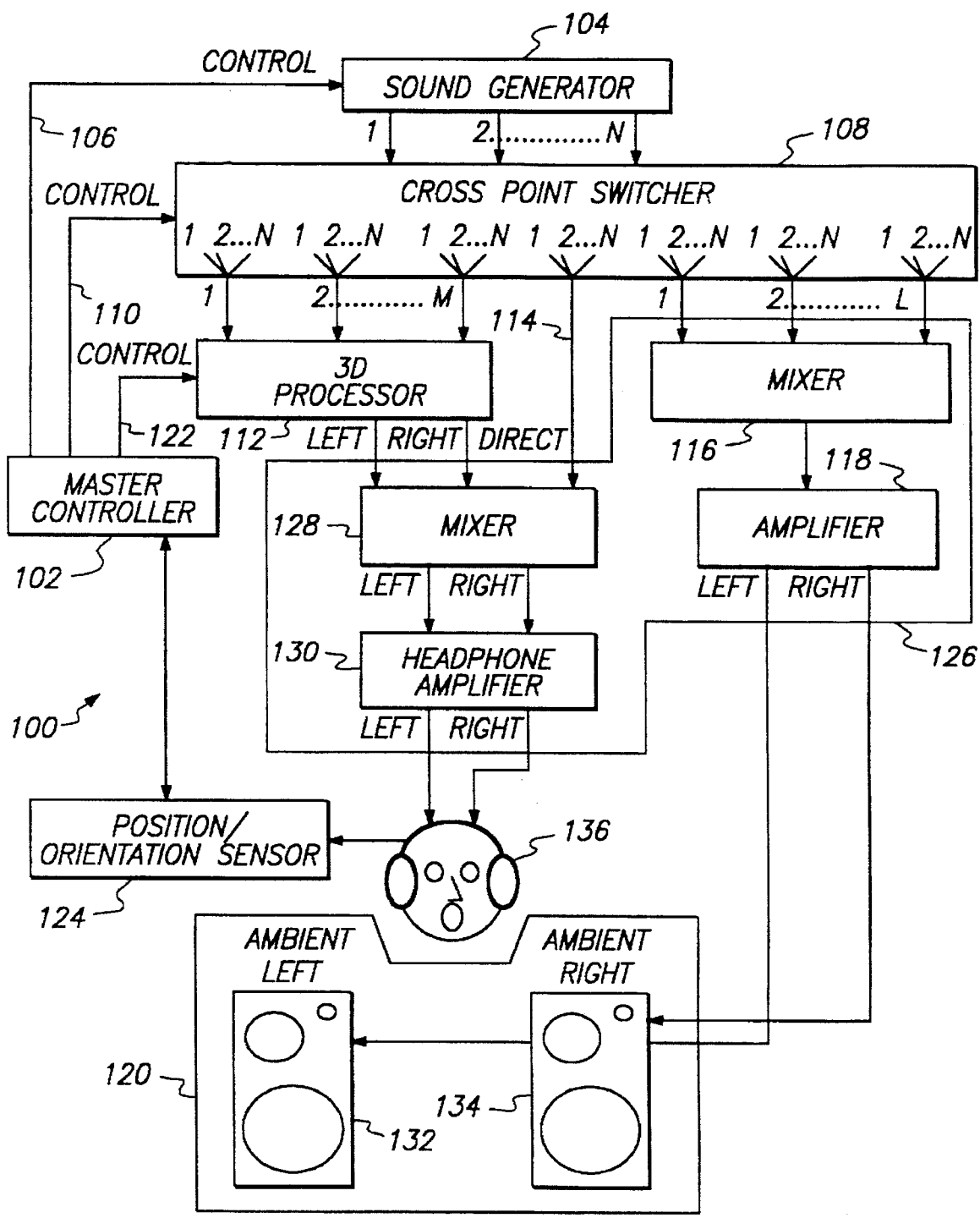
FIG. 1 is a simplified block diagram of an exemplary sound system in which the scheduling and prioritized allocation techniques of the present invention can be implemented.

The scheduling and prioritized allocation methods and systems of the present invention can be implemented in substantially any multiple-channel sound system in which sounds can be selectively generated and routed through different channels of the system under the control of a general purpose computer. FIG. 1 illustrates a simplified block diagram of an exemplary embodiment 100 of such a sound system.

Sound system 100 is controlled by master controller 102, which can be implemented using a general purpose computer. The control functions of master controller 102 are generally divided into two levels. On a first level, master controller 102 executes a control program calling upon the master controller to issue requests for the sound system to produce dialogue, sound effects and musical score. As part of this level, master controller also computes updated information for modeled, sound-making, objects in the virtual world environment. On a second level, master controller 102 services the dialogue, sound effect and musical score requests while tracking resource usage and resource allocation within sound system 100, as well as sound position histories to determine Doppler caused pitch shifts. If desired, two or more computers can be used to implement the functions of master controller 102.

Sound generator 104 is the source of all audio program material in the system. Its features include rapid, random access to any item in its repertoire. These items might include short or long pieces of music, dialogue tracks, sound effects and background sound. Control signals are provided to sound generator 104 by master controller 102 on control signal path 106. These control signals direct specific sounds from the sound generator repertoire to be played on any one of a plurality of audio outputs 1 ... N. Control signal path 106 preferably is implemented in accordance with the Musical Instrument Digital Interface (MIDI), a standardized hardware interface and communication protocol for communicating information about music and other sounds between different electronic devices, such as computers and sound synthesizers. Devices of different types are made compatible with one another by providing each device with a "MIDI out" or a "MIDI in" port, or both. A device with a "MIDI out" port can be connected to a device with a "MIDI in" port to transmit commands and other information using a standardized system of codes. A MIDI implementation thus permits a wide variety of commercially available digital audio products to be easily used in the sound system.

The MIDI protocol includes a library of standardized commands by which one electronic device can instruct another to perform certain tasks. The command library is composed of multiple command levels. On one level, for example, are general commands to which all MIDI-compatible devices must be capable of responding in accordance with requirements prescribed by the protocol. On another level are commands divided into classes, each class including commands that are specifically tailored for a particular category of devices. The MIDI protocol also allows vendors to add "device specific" commands. The particular way in which the MIDI protocol is used in sound system 100 will be illustrated by occasional examples. However, the full implementation is not discussed with particularity in order to avoid unnecessarily encumbering the following discussion with a description of techniques that are conventional and well known to those skilled in the art. Further, it will be readily understood by such individuals from the following discussion that the MIDI protocol is used in the disclosed embodiment for convenience, and that the present invention can be implemented using other communication protocols.

Sound generator 104 can be implemented using a general purpose computer configured with a plurality of digital sound circuits. These circuits can be implemented in an Apple Macintosh computer, for example, using plug-in SampleCell cards, commercially available from Digidesign, Inc., of Menlo Park, Calif., which have memory for storing digital data representative of various sounds and "instrument" configuration information relating to the manner in which stored sounds are reproduced. The SampleCell cards preferably are used to store and play back relatively short (typically 30 seconds or less) sounds such as dialogue segments, etc.

Longer sounds, such as a musical score, tend to require digital sample data exceeding the memory capacity of the SampleCell cards. Accordingly, such data can be stored on a hard disk mass storage device. To provide real time playback of the digitized musical score directly from the hard disk, sound generator 104 may include specialized interface hardware to accelerate data transfer from the disk drive. A commercially available plug-in circuit called a Sound Accelerator II, Rev. B, from Digidesign, Inc., can be used for this purpose.

The outputs of the sound generator are coupled to inputs of cross point switch 108. Cross point switch 108 operates under the control of master controller 102 via MIDI commands communicated on control signal path 110. Using MIDI commands, master controller 102 can cause cross point switch 108 to switch a particular output to a particular input, or to vary the output volume. Suitable MIDI-controlled switching devices for implementing cross point switch 108 are commercially available from various manufacturers and are well-known in the art. For example, a suitable 16 input, 16 output MIDI-controlled cross point switch called the AM16B Audio Crosspoint Switcher is commercially available from 360 Systems of Tarzana, Calif.

Sound generator 104 is programmed with commercially available software programs to control the operation during run time of the digital sound circuits and the hard disk. These programs run as concurrent processes or tasks. In a Macintosh computer, for example, they may include a program from Apple Computer called MIDI Manager, and a program from Digidesign, Inc., called Livelist. The MIDI Manager program is a device driver that extends the operating system of the Macintosh computer in order to support MIDI devices, and includes a "PatchBay" configuration routine that routes incoming MIDI commands from master controller 102 to individual digital sound circuits, each of which functions as a separate MIDI device and thus has a separate MIDI device number by which it is addressed by master controller 102 in the commands. The Livelist program controls playback of sound from the hard disk. The Livelist program, like the digital sound circuits, functions as a separate MIDI device, and also receives MIDI commands from master controller 102. In accordance with conventional techniques, master controller 102 may use "NOTE ON" and "NOTE OFF" commands in the MIDI protocol to command each MIDI device to initiate and terminate sounds.

Outputs 1 ... M of cross point switch 108 are coupled to inputs of spatial sound processor 112. Master controller 102 directs sounds requiring spatial positioning to one of these M physical sound channels, as illustrated by the exemplary embodiment discussed in greater detail below. A single output channel 114 of cross point switch 108 is dedicated to reproducing non-localized sounds destined for direct feed to the viewer's headphones. Such sounds may include, for example, a musical score and narrative.

The remaining outputs 1 ... L of cross point switch 108 are combined into a diffuse ambient sound channel by mixer 116 and reproduced by amplifier 118 and speaker system 120. Audio signals typically routed to this channel might include, for example, distant sounds, sounds with no particular position such as traffic noise, background wind and bird chirps, or sounds for which a channel of spatial sound processor is temporarily unavailable (as discussed below).

Spatial sound processor 112 is a device capable of taking a monophonic sound unmodified with respect to filtering or reverberation and imposing on it filtering, delay, reverberation, and other processing functions necessary to produce a stereophonic sound with appropriate psychoacoustic properties that provide positional and directional cues for the sound. This processing is performed so that the sound, though delivered over headphones, is perceived to originate from a specified point in 3-D space. Spatial sound processor 112 can be implemented, for example, using a commercially available spatial sound processor known as a Convolvotron, manufactured by Crystal River Engineering of Groveland, Calif.

The Convolvotron includes two circuit boards that are installed in slots of a PC-compatible computer. The Convolvotron uses a spatial sound synthesis method involving the direct convolution of an audio signal with pairs of filters corresponding to measured pinnae impulse responses. The computational heart of the Convolvotron are four cascadable digital signal processors each of which is capable of performing convolutions having as many as 128 terms. The processors can be arranged as desired to provide real time spatial sound processing on one to four separate channels, depending on the number of convolution terms the user desires for each channel. Additional Convolvotron boards can be installed in the computer to provide more 3-D channels. The Convolvotron can accept audio signals in analog or digital format. In system 100 of FIG. 1, the analog inputs are used for convenience although the system could be configured with digital sound sources directly feeding digital inputs to the Convolvotron.

When master controller 102 directs a sound to spatial sound processor 112, it also provides spatial sound processor 112 with 3-D position information for the channel. The position information is updated periodically, preferably at a rate of approximately 60 Hz, using control signal path 122.

The Convolvotron accepts channel position information in either head-relative or absolute position format. The head-relative format means that the Convolvotron will interpret channel position data that it receives as data indicative of the channel's position relative to a coordinate system based on the viewer's headset. Relative position information requires that master controller 102 be aware of, and must calculate the positions of virtual sound sources with reference to, the viewer's head position and orientation in the virtual world. This information is available from the graphical rendering portion of the virtual world system. The results of the calculation are sent to the Convolvotron. This procedure minimizes the volume of position data communicated to the spatial sound processor, thus allowing for more frequent updates and resulting in a quicker system response.

Alternatively, the absolute position format capability of the Convolvotron could be used. Absolute position format means that the Convolvotron will interpret channel position data that it receives as data indicative of the channel's position relative to an arbitrary coordinate system in the real world that is independent of the position and orientation of the viewer's headset. When using this type of position information, data indicative of the position and orientation of the viewer's head (in the same coordinate system) would also be sent by master controller 102 to the Convolvotron. The absolute position format requires less calculation by master controller 102 than in the case of relative position format, but a greater volume of position data must be communicated to the Convolvotron than is required by the head-relative format.

A third type of positioning, incremental positioning, could also be used to convey channel position, but is not supported by the Convolvotron. Incremental position information is based on a cumulative change with respect to an absolute or relative position coordinate. With incremental positioning, once a position is communicated to master controller 102, only the incremental changes are sent and their values are cascaded upon the original coordinate. Incremental positioning may be used for sound source or head positioning. The advantage to this type of position information is that only a minimum of data must be communicated, but the disadvantage is that cumulative error, either from mathematical precision limits or from communication errors, can degrade performance.

Master controller 102 is informed of the viewer's head position by position and orientation sensor 124. Spatial sound processor 112 can, alternatively, be provided with the viewer's head position directly if absolute positioning is used. To avoid audible discontinuities in the position of sounds and to prevent excessive lag in the spatial sound processor, the update rate of position sensor 124 should be greater than 30 Hz. Below this threshold it becomes necessary to filter the position information heavily in order to smooth it, but then excessive delay becomes a problem.

FIG. 1 shows that, in addition to mixer 116 and amplifier 118, mixer/amplifier system 126 includes mixer 128 and headphone amplifier 130. Ambient speaker system 120 is shown as including a pair of speakers 132 and 134 positioned close to the viewer so that sounds reproduced by the speakers can be heard by the viewer in addition to sounds being reproduced on headphones 136 connected to headphone amplifier 130. Thus, as shown, the diffuse ambient sound channel system formed by mixer 116, amplifier 118 and speaker system 120 is a plurality of channels mixed together and played over an array of speakers physically located around the viewer. Although FIG. 1 shows only two speakers in the array, a greater number of speakers may be used to provide greater diffuseness when reproducing ambient sounds. Alternatively, the effect of background sounds can be achieved by processing the channels to remove autocorrelation effects (i.e., localization cues) and playing them in the viewer's headphones or on separate head mounted speakers instead of independently playing them around the viewer's person. Autocorrelation effects can be removed using a phase-scrambling all pass filter to introduce various frequency-dependent phase delays into the channels.

Preferably, master controller 102 is provided with the capability to cross-fade a sound from an input channel of spatial sound processor 112 to one of the non-localized channels, and vice versa. This extends the dynamic allocation capabilities of the master controller to enable the transfer of a long, continuous sound (e.g., airplane engine noise) from the background to a localized position as the control program deems the sound to rise in priority (based, for example, on the proximity of the sound source to the viewer or the importance of the sound to the creation of a 3-D illusion). The reverse process is useful for freeing a spatial sound processor channel as a sound's priority diminishes.

Cross-fading is accomplished, for example, by master controller 102 commanding sound generator 104 to play a particular sound simultaneously on two of its output channels. Master controller 102 also instructs cross point switch 108 to connect one of the two outputs to an input of spatial sound processor 112 and the other to an input of mixer 116. A series of MIDI commands are issued by master controller 102 to sound generator 104 or cross point switch 108 to gradually reduce the volume on the spatial sound processor channel while increasing the volume on the background channel, or vice versa, depending on the direction of the cross-fade.

Exemplary data structures and routines for implementing the scheduling and prioritized allocation techniques of the present invention in sound system 100 are illustrated in FIGS. 2–9. These data structures and routines are based on the C++ software language, but software languages other than C++ are also suitable for programming master controller 102.

Figures 8, 9:
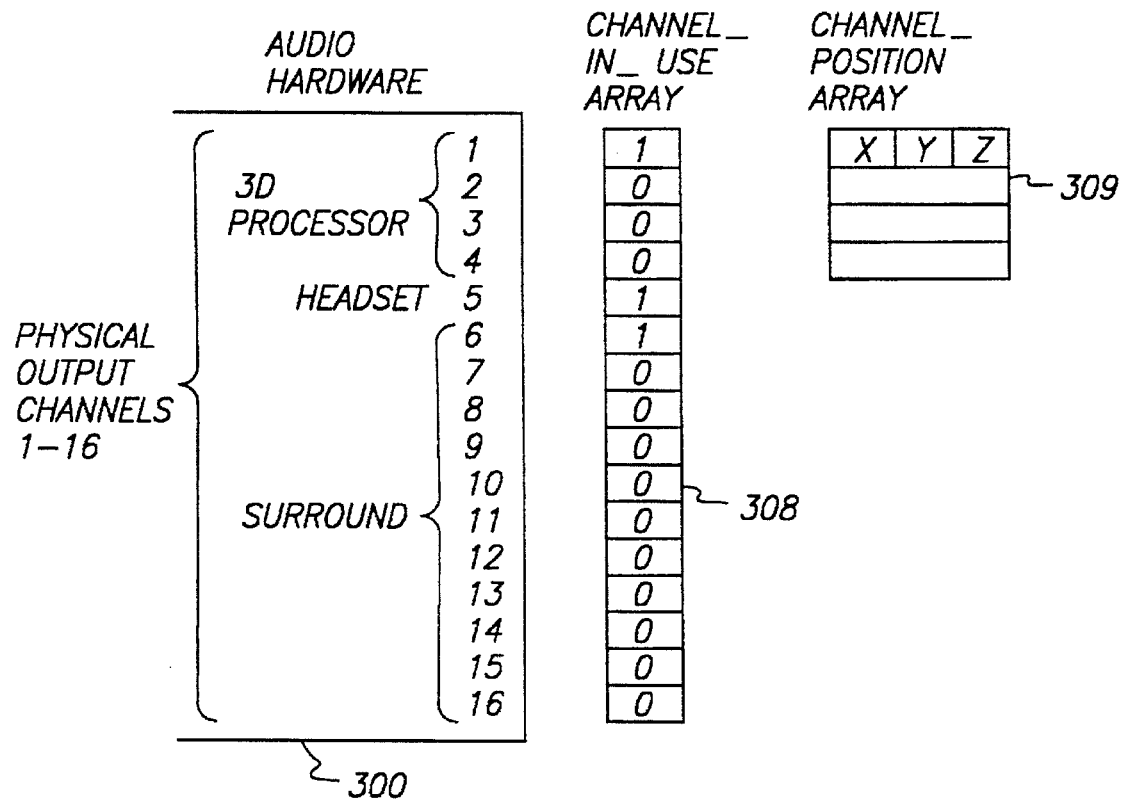
FIG. 8 shows an exemplary embodiment of a data structure also used by the master controller of the sound system of FIG. 1 to manage the generation and delivery of sounds in accordance with principles of the present invention.
FIG. 9 shows further additional exemplary embodiments of data structures used by the master controller of the sound system of FIG. 1 to manage the generation and delivery of sounds in accordance with principles of the present invention.

Master controller 102 is programmed with an array of parameters relating to the sounds that are in the repertoire of sound generator 104. The array contains an entry for each sound stored in sound generator 104. An exemplary embodiment 200 of the array is illustrated in FIG. 8. As shown in FIG. 8, each sound in the array is assigned a "SOUND ID" number (from 1 . . . n) and may alternatively be referenced by name (such as "bark") for convenience. Array 200 further includes: the MIDI note that has been assigned to the sound in the sound generator ("C2" represents 2 octaves above middle C); the MIDI channel number of the instrument in which the sound is stored; the duration of the sound (in ⅙₀ths of a second); the sound generator output on which the sound will play (or a corresponding switch input number); the absolute volume of the sound (in arbitrary units from 0 to some maximum number such as 127 or 255 depending on the number of bits available), which provides a reference value for setting the master volume of the instrument in which the sound is stored to optimize the signal to noise ratio of the sound; the relative volume of the sound, which in units of decibels identifies the loudness of the sound relative to the loudest sound in the virtual world (e.g., if an airplane engine is the loudest sound, a person speaking might have a relative volume of −50 dB); and a pitch control value, which identifies any pitch shift to be applied to the sound by the sound generator.

The volume at which sound generator 104 produces a particular sound is a function of the volume level at which the sound sample is recorded and the volume of the sound generator instrument in which the sound sample is stored. Volume control plays an important part in the creation of a simulated three-dimensional audio environment. For example, a natural three-dimensional audio environment typically includes a variety of sound sources producing sounds at different volumes. A simulated three-dimensional audio environment, to be realistic, should likewise contain sound sources having appropriately differentiated volumes (e.g., a jet engine should be louder than a bird). For additional realism, a simulated three-dimensional audio environment should also take into account the attenuating effect of distance, such that the perceived loudness of a sound is higher when the sound source is near the listener and lower when the listener and the sound source are farther apart.

Thus, it is important that a virtual reality system be capable of selectively controlling the volume at which each sound in the simulated three-dimensional audio environment is reproduced. On the other hand, it is also important that sound samples be recorded, stored and processed at high volume levels to optimize their signal to noise ratios, regardless of the volume level at which the sounds are intended to be heard by the listener. These two important goals are achieved by system 100 using the absolute and relative volume parameters associated with each sound stored in array 200.

The absolute and relative volume parameters comprise separate volume scaling components. The absolute volume parameter provides a value that can be sent by master controller 102 to sound generator 104 in a MIDI command to selectively control the output gain (amplification) of sound generator 104 when converting the stored data representative of a particular sound into an audio signal provided to cross point switch 108. Preferably, the absolute volume parameter is set to a value which causes the associated sound to be generated by sound generator 104 at the maximum volume acceptable (without distortion) as an input by cross point switch 108, thus optimizing the signal to noise ratio of the sound as it is processed by sound generator 104 and cross point switch 108. This value may be the same for all sounds, or it may vary from one sound to the next, depending on the volume level at which each sound was recorded, the volume level of the stored data representing each sound, and the audio signal input range of cross point switch 108.

The relative volume parameter is used by master controller 102 to attenuate sounds generated by sound generator 104 to desired relative volume levels for the viewer. Such relative volume control is accomplished by sending MIDI commands to cross point switch 108 or spatial sound processor 112, or both, which instruct the receiving device to attenuate the volume on a specified channel in accordance with the relative volume value of a sound playing on that channel. The combination of absolute and relative volume parameters permits sound storage, delivery and processing to take place in system 100 with a maximized signal to noise ratio, while retaining the "true" overall signal level of each sound representing the intended loudness of its source in the virtual world.

Preferably, relative volume control used in combination with a distance-based volume attenuation function, such that as the distance in the virtual world between a sound source and the viewer changes, the viewer perceives a corresponding change in volume. Such a distance-based attenuation function can be performed by master controller 102 or spatial sound processor 112, or both. For example, master controller 102 may be programmed to calculate the distance in the virtual world between the viewer and an object which is to emanate a sound, and to adjust the volume of the channel on which the sound plays as a function of the calculated distance to simulate the attenuating effect of distance in the virtual world. These calculations and adjustments also may be accomplished automatically by spatial sound processor 112 based on position data provided by master controller 102.

The pitch control value is a 16 bit unsigned integer in hexadecimal format. A value of 2000H specifies that sounds are to be reproduced as stored without any pitch shift. A value less than 2000H specifies that the pitch is to be shifted downward in frequency, with a 0001H value indicating a maximum downward shift of one octave. Similarly, pitch control values above 2000H tell the sound generator to increase the pitch of a sound, with 3FFFH indicating a shift upward of one octave. A value of 0000H would flag the program that no dynamic shifting is to be used. In sound generator 104, pitch shifts are controlled by a procedure that is designated internally as a MIDI controller. Master controller 102 can alter the pitch shift of a sound by sending to sound generator 104 a MIDI UPDATE CONTROLLER command specifying the designated MIDI controller and an updated pitch control value.

Figure 2:
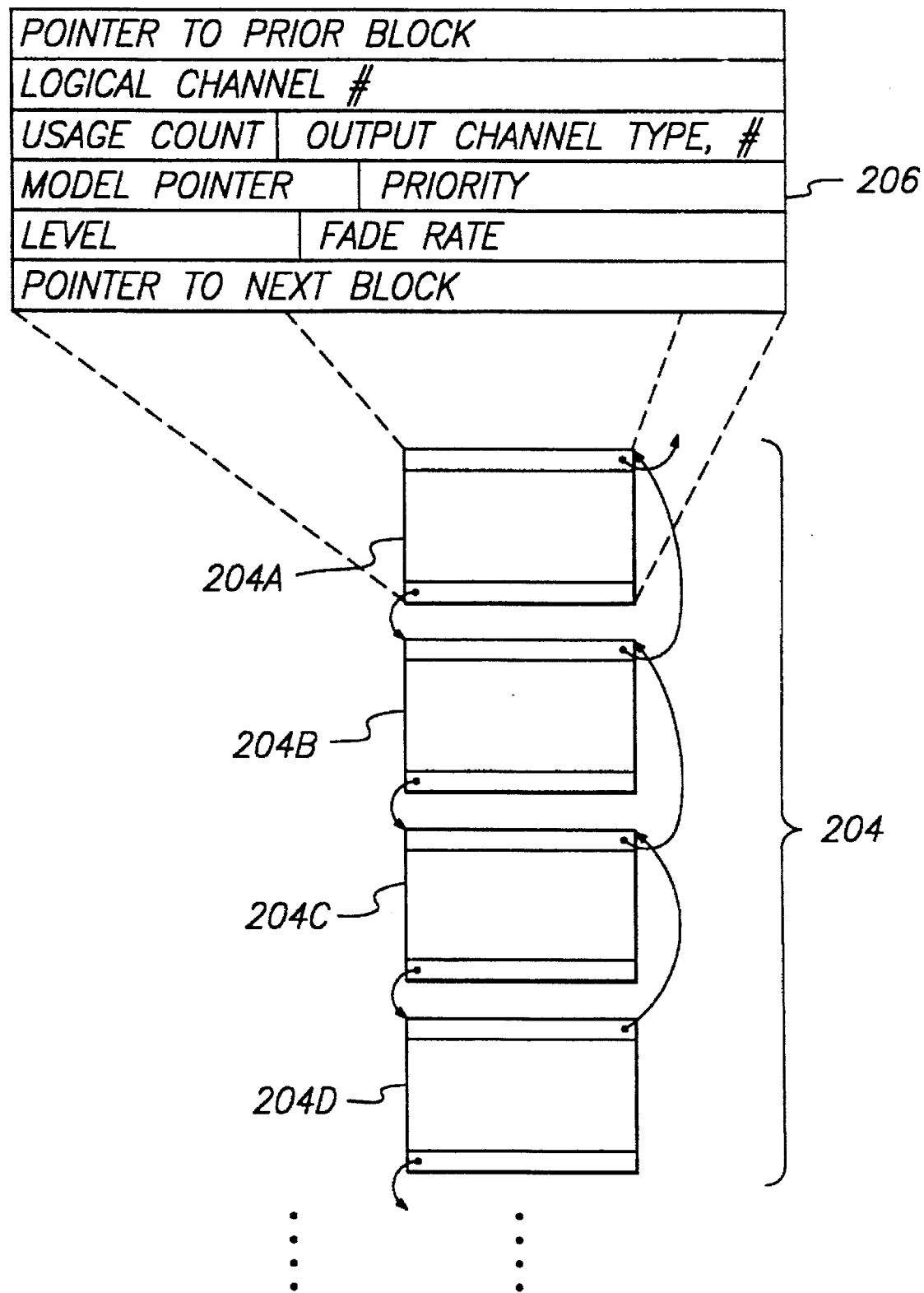
FIG. 2 shows exemplary embodiments of data structures used by the master controller of the sound system of FIG. 1 to manage the generation and delivery of sounds in accordance with principles of the present invention.

Referring to FIG. 2, master controller 102 is also programmed with a data structure which identifies each potential virtual world sound source, or "logical channel". This data structure comprises, for example, a doubly-linked list of a class of C++ logical channel objects. There may be hundreds of such logical channels, greatly exceeding the number of physical sound channels in system 100. Such a doubly-linked list 204 of logical channel objects 204A, 204B, 204C, 204D, etc. is illustrated in FIG. 2. As shown by the expanded logical channel object form 206 in FIG. 2, each logical channel object has the following parameters: a "logical channel #" (defined by the position of the object on the list); a "usage count," which identifies how many sounds are being produced by the virtual sound source corresponding to the logical channel; "output channel type, #", which specifies a physical sound channel by type (such as 3-D, headphone center or ambient) and by number; a "model pointer", which is a pointer for attaching a logical channel to a model (if desired); a "priority" value; a "level," which can be specified to modify the volume of any sound produced on the channel; and a "fade rate," which can be specified to set a rate for fading sounds in or out on the logical channel. In addition, each logical channel object includes a "pointer to prior block" and a "pointer to next block" within the doubly-linked list.

Each parameter of a logical channel object typically is assigned an initial value when the logical channel object is created (e.g., "output channel type, #" is set to "NONE"). Logical channel objects are created when the control program of master controller 102 is compiled. During execution of the control program, the parameters of a logical channel object can be modified either in response to a direct instruction of the control program to modify a particular parameter or by a routine called by the control program, as will be further explained in the discussion below.

The playing of a sound requires that the sound be associated with a logical channel. This is accomplished by a control program (or script) executed by master controller 102 which instructs that a particular sound be played on a particular logical channel. For example, a script may contain an instruction to "SAY s.wind ON o.bkgd," where s.wind specifies a particular sound (e.g., a sound produced by a wind) in sound generator 104 and o.bkgd specifies a particular logical channel object on linked-list 204.

However, a physical sound channel must be allocated to the logical channel before the sound can be played. In response to the "say" instruction, master controller 102 will attempt in usual cases to allocate an ambient physical sound channel to the logical channel unless a physical sound channel of some type has already been allocated to the logical channel object (as indicated by the "output channel type, #" parameter of the logical channel object).

In the case that a sound source is to be localized to a particular position in three-dimensional space when emanating a particular sound, the script first instructs that a logical channel on which that sound is to be played be "tied" to a particular point, or to a particular model representing a graphic object, before instructing the logical channel to play the sound. In connection with executing the "tie" instruction, master controller 102 attempts to allocate a channel of the spatial sound processor to the logical channel object. If no channel of the spatial sound processor is available for allocation at this time, master controller 102 may allocate a non-localized channel instead and try again to allocate a spatial sound processor channel in response to a subsequent "say" instruction. The execution of such "say" and "tie" instructions is described more fully below by simultaneous reference to FIGS. 3–5 and 9.

FIG. 9 illustrates an embodiment of system 100 having audio hardware 300 which provides 16 separate physical sound channels numbered consecutively from 1 to 16. Physical sound channels 1–4, corresponding for example to outputs 1–M of cross point switch 108 of FIG. 1, are coupled to the sound data inputs of a spatial sound processor (e.g., spatial sound processor 112 of FIG. 1). Physical sound channel 5, corresponding for example to output 114 of cross point switch 108, is coupled to a headphone mixer (e.g., mixer 128 of FIG. 1). Physical sound channels 6–16, corresponding for example to outputs 1–L of cross point switch 108, are coupled to the inputs of an ambient channel mixer (e.g., mixer 116 of FIG. 1).

Figure 3:
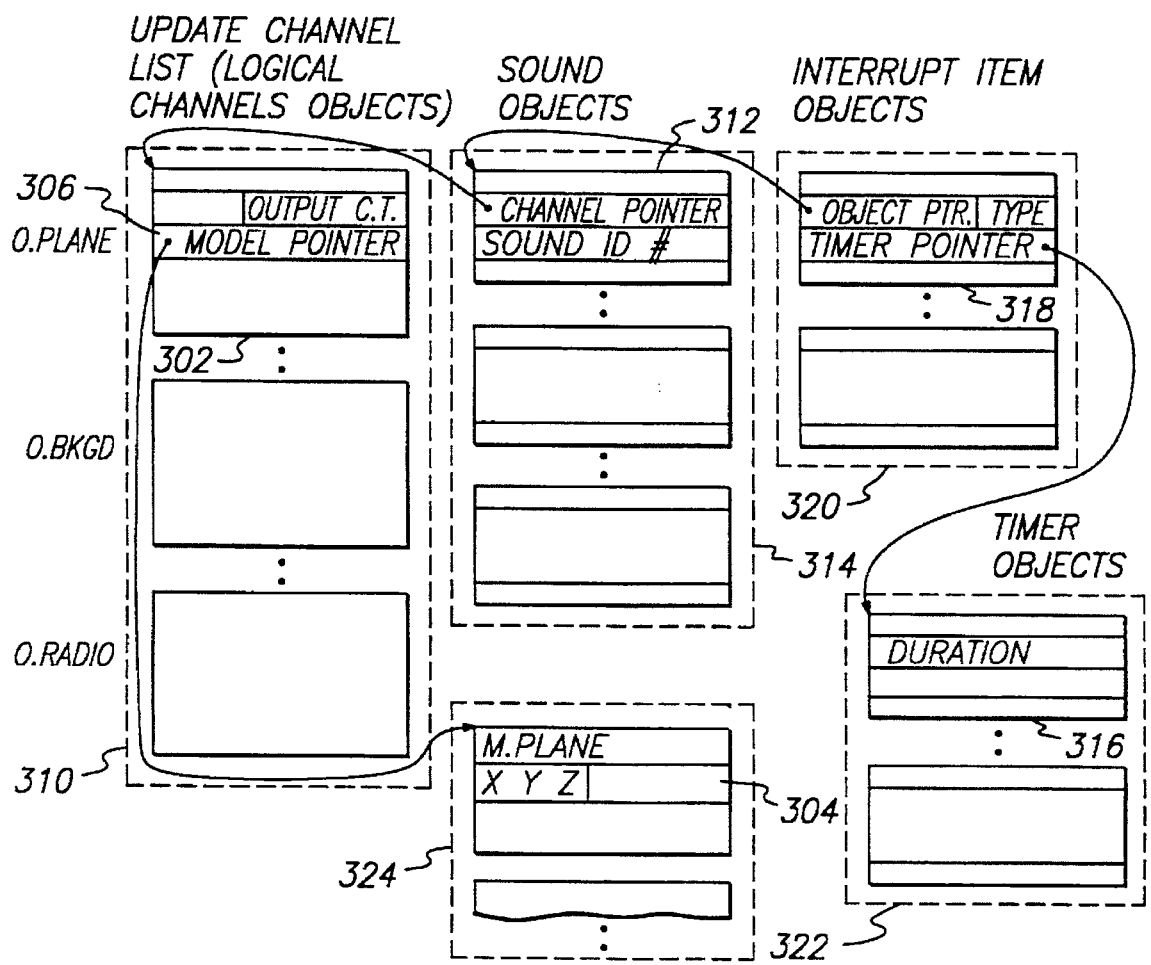
FIG. 3 shows additional exemplary embodiments of data structures used by the master controller of the sound system of FIG. 1 to manage the generation and delivery of sounds in accordance with principles of the present invention.

FIG. 3 and 9 also illustrates additional data structures maintained in the memory of master controller 102 for purposes of manipulating and scheduling sound system resources. These data structures include two arrays, channel-in-use array 308 and channel-position array 309. Channel-in-use array 308 contains information indicative of whether a particular physical sound channel has been allocated to a logical channel. Channel-position array 309 contains position information for each channel of the spatial sound processor. The data structures also include lists of different objects, including an update channel doubly-linked list 310 of logical channel objects, a sound object doubly-linked list 314 of currently active sound playback objects, an interrupt object doubly-linked list 320 to associate timers with the completion of sound playback, a timer object doubly-linked list 322 to count down sound durations and a model declaration list 324 used to record the status and position of models in the virtual world.

Figure 4:
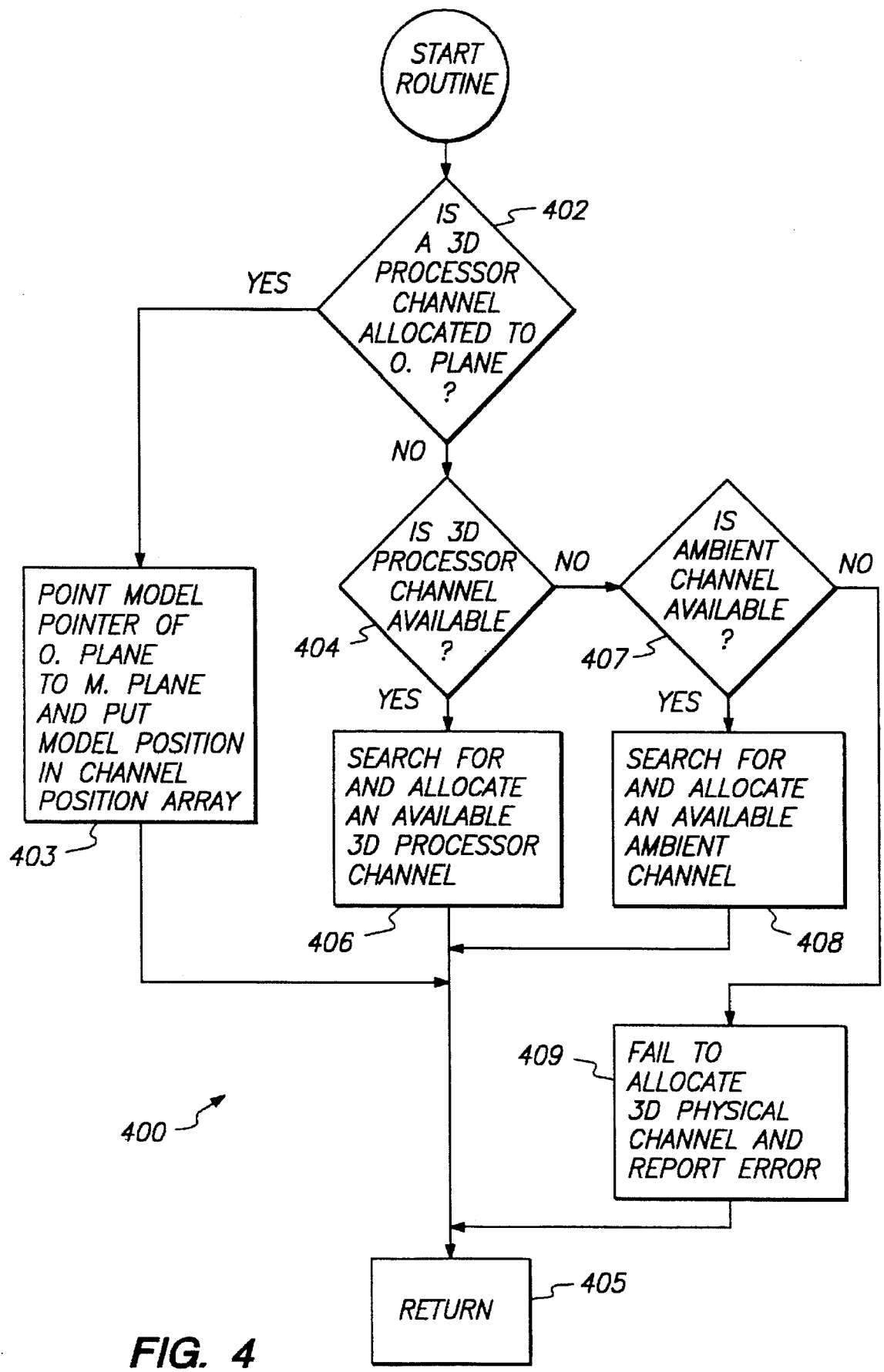
FIGS. 4 and 5 show flowcharts of the steps of an exemplary method for scheduling resources of the sound system of FIG. 1 in accordance with principles of the present invention.
Figure 5:
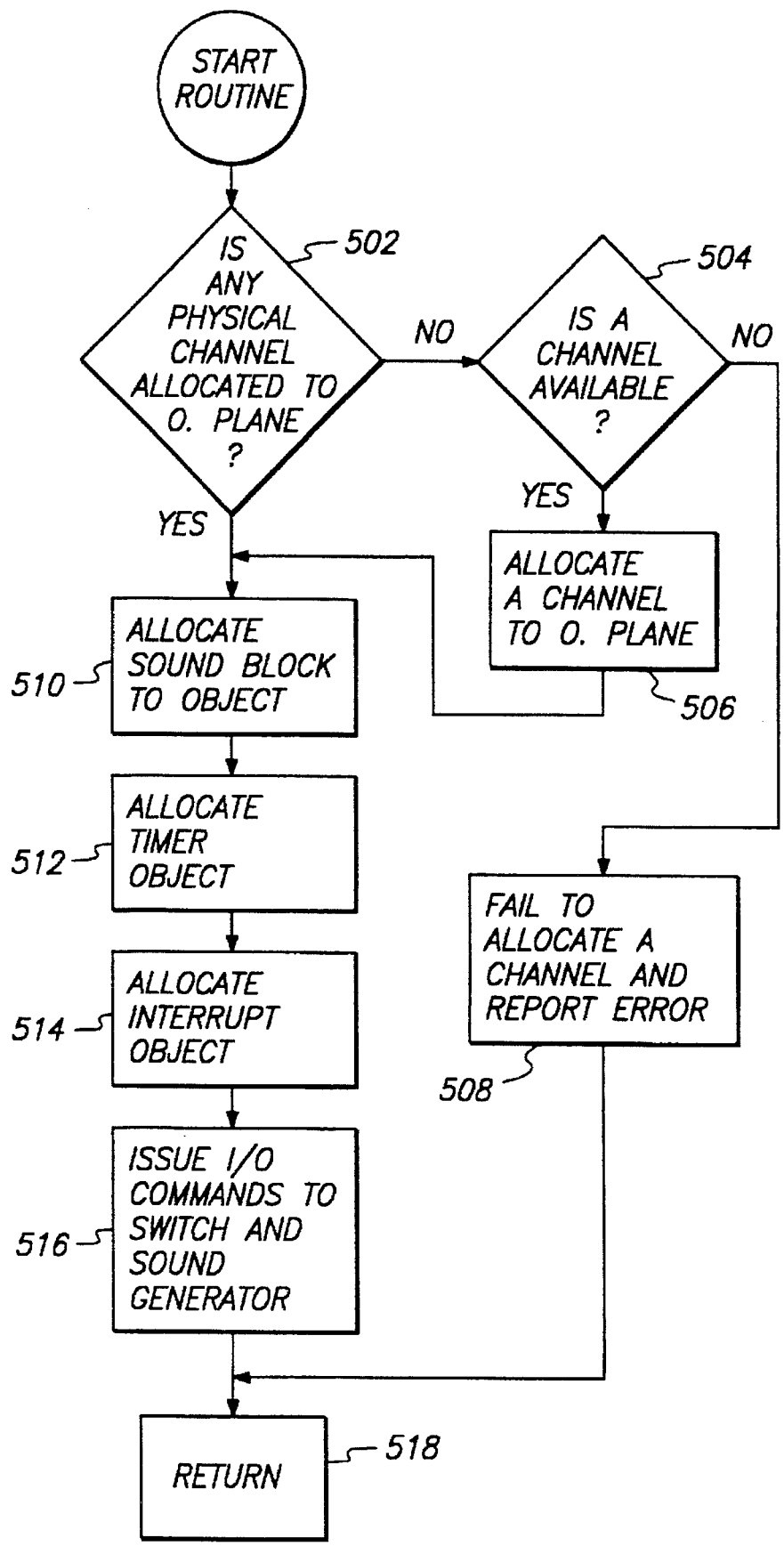

FIGS. 4 and 5 show exemplary flowcharts of steps performed by master controller 102 for scheduling sound resources responsive to "tie" and "say" script instructions in accordance with principles of the invention. A person of ordinary skill in the art will recognize that the execution of such script instructions, and the values of their arguments, can be conditioned upon certain movements and actions of the viewer. For example, the script may contain two "say" instructions, one instructing a logical channel to play a first sound and the second instructing the logical channel to play a different sound. Master controller 102 may be programmed to condition the execution of the second instruction on the viewer performing some act, such as nodding, following the playing of the first sound.

An instruction of the type "TIE o.plane TO m.plane" may be used in a script of virtual world events to force a sound source to be localized to a particular position in three-dimensional space (e.g., in the case of tying an engine noise to a model of an airplane). Referring to flow chart 400 of FIG. 4, "TIE o.plane TO m.plane" would cause master controller 102 at step 402 to first determine if the logical channel object o.plane 302 has already been assigned or allocated to a physical channel (1 . . . M) of spatial sound processor 112. This is accomplished by examining the "output channel type, #" parameter of o.plane (see, e.g., expanded logical channel object form 206 of FIG. 2). If a channel of spatial sound processor 112 has not already been allocated to o.plane, master controller 102 at step 404 looks to channel-in-use array 308 maintained in its memory to determine if any one of the physical output channels corresponding to the channels of the spatial sound processor is available. An available channel is indicated by a "0" in array 308. A "1" indicates a channel in use by another object. Bits in the array are set and reset by master controller 102 whenever channels are allocated and de-allocated, respectively.

If a channel of spatial sound processor 112 has already been allocated to logical channel object o.plane, master controller 102 at step 403 assigns the logical channel object o.plane 302 to the model m.plane by loading model pointer location 306 with a pointer to model declaration 304 corresponding to model m.plane at a position x, y, z in the virtual world, and loads the x, y, z position data from model declaration 304 into the location in channel-position array 309 corresponding to the allocated channel of spatial sound processor 112. Master controller 102 then returns to the script at step 405.

Assuming a channel of spatial sound processor 112 is not currently allocated to any logical channel object, master controller 102 at step 406 allocates the channel to o.plane by setting the corresponding bit in array 308 to "1", writing the channel type and number into the "output channel type, #" parameter location of the o.plane logical channel object, loading model pointer location 306 with a pointer to model declaration 304 corresponding to model m.plane at a position x, y, z in the virtual world, loading the x, y, z position data from model declaration 304 into the location in channel position array 309 corresponding to the allocated channel of spatial sound processor 112, and placing the o.plane object 302 on update channel list 310. Master controller then returns to the script at step 405.

If a channel of spatial sound processor 112 is unavailable at step 404, master controller 102 branches instead to step 407. At step 407, master controller 112 searches channel-in-use array 308 for an available one of ambient channels 6–16 (i.e., in FIG. 9 the number of channels L generally shown in FIG. 1 is 11). Upon finding an available ambient channel, master controller 102 branches to step 408 at which it allocates the available channel to logical object o.plane. At step 408 master controller 102 may also flag the allocation request such that upon execution of a subsequent instruction to play a sound on logical channel o.plane master controller 102 again search for an available spatial sound processor channel. Master controller 102 then returns to the script at step 405. If no ambient channel is available, at step 409 master controller 102 fails to allocate a physical sound channel and reports an error to a system monitor. At step 409 master controller 102 may also flag the allocation request for retry upon execution of a subsequent instruction to play a sound on logical channel o.plane. Master controller 102 then returns to the script at step 405.

To cause the sound to be played, a script command of the type "SAY s.noise ON o.plane" may be used. FIG. 5 illustrates the execution of this instruction. At step 502 master controller 102 first determines if the logical channel object o.plane 302 has already been assigned or allocated to a physical channel of any type. This is accomplished by examining the "output channel type, #" parameter of o.plane (see 206). If a physical sound channel has not already been allocated to o.plane, master controller 102 at step 504 looks to channel-in-use array 308 maintained in its memory to determine if any physical output channel is available. If one is available, master controller 102 at step 506 allocates the channel to o.plane in the manner previously described in connection with flowchart 400 of FIG. 4. Master controller 102 then proceeds to step 510.

If a channel is not available, at step 508 master controller 102 fails to allocate a physical sound channel and reports an error to a system monitor. Master controller 102 then returns to the script at step 518.

At step 510 a sound block data structure is created by master controller 102 which links logical channel o.plane with the sound s.noise. This is accomplished by allocating an object of the type shown by sound object 312, having two parameters: a pointer to the logical channel object o.plane 302, and the sound ID # of the sound s.noise within sound data array 200. The allocated sound object is placed in linked list 314 of allocated sound objects.

Next, at step 512, master controller 102 creates a timer object 316 having a duration parameter set to the duration value of sound s.noise in sound data array 200. The time set by this duration parameter in timer object 316 is ticked off periodically by the control program of master controller 102. The purpose of the timer is to notify master controller 102 when the sound s.noise is finished so that the physical output channel on which the sound was playing can be made available again for (allocated to) another sound. To notify master controller 102 of the expiration of timer 318, an interrupt object 318 is allocated at step 514.

When interrupt object 318 is allocated, it is assigned (through a "timer pointer") to timer object 316. Upon the expiration of timer 316, the interrupt object causes master controller 102 to take an action specified by the interrupt type (in this case, deallocating a physical channel). Each interrupt object includes a pointer to the item to which it relates (here, a sound object), the above-mentioned type parameter identifying the function of the interrupt.

At step 516, master controller 102 next issues (1) a MIDI command to cross point switch 108 to connect the appropriate output of sound generator 104 to the appropriate input of spatial sound processor 112 or mixer 116, (2) a MIDI command to spatial sound processor 112 or mixer 116 to set the output gain of the allocated channel in accordance with the relative volume value of sound s.noise indicated in sound data array 200, and (3) a MIDI command to sound generator 104 to initiate the playing of sound s.noise. A MIDI command adjusting the volume of the instrument in which s.noise is stored may also be sent to sound generator 104 in accordance with the absolute volume parameter associated with s.noise. After step 516, the sound begins playing as allocated and the routine returns at step 518.

Figure 6:
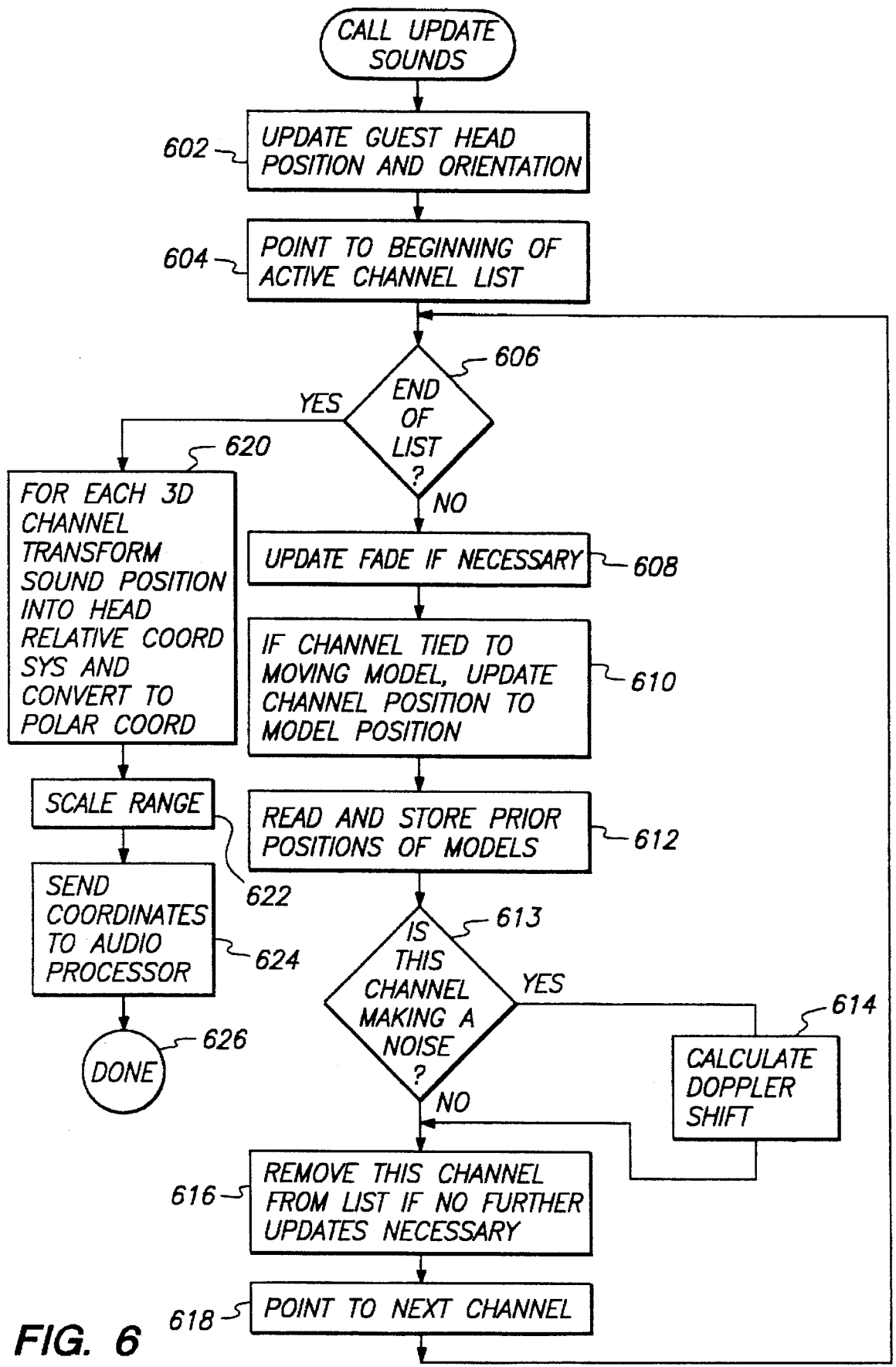
FIG. 6 shows a flowchart of the steps of an exemplary method for updating the scheduling of resources of the sound system of FIG. 1 in accordance with principles of the present invention.

FIG. 6 illustrates a flowchart of an exemplary embodiment of an UPDATE SOUNDS routine which is called periodically (e.g., once every 1/60th of a second) to service update channel list 310. This routine provides spatial sound processor 112 with current "head-relative" position data for each channel of the processor that is tied either to a specific point or to a moving model in the virtual world. The UPDATE SOUNDS routine also is used to update any channel fades that are in progress and to remove from update channel list 310 any logical channel objects (e.g., 302) that no longer need updating. In addition, the UPDATE SOUNDS routine calls a routine to calculate a simulated Doppler pitch shift for each channel of the spatial sound processor that is tied to a moving model actively generating a sound.

The UPDATE SOUNDS routine begins at step 602 by updating the position and orientation of the viewer's ("guest's") head relative to the fixed coordinate system of the virtual world. This is accomplished by taking data specifying the current position and orientation of the viewer's head in six dimensions (x, y, z, roll, pitch and yaw) relative to a fixed reference coordinate system in the real world (such as a coordinate system having its origin at a point on the floor where the viewer is standing or on a seat in which the viewer is sitting) and adding these data to other data specifying the position and orientation in the virtual world of the viewer. The data specifying the viewer's head position may be obtained by a conventional position tracking device such as The Bird, manufactured by Ascension Technologies, Inc. of Colchester, Vt.

Then, at step 604, a pointer (TEMP) is set to the beginning of update channel list 310, and the routine enters a loop to traverse and update the objects on update channel list 310. The loop begins at step 606 by determining from the value of the TEMP pointer whether there is a logical channel object on update channel list 310 at the present value of the pointer. A null TEMP pointer indicates that the end of update channel list 310 has been reached. In the first iteration of the loop, a null TEMP pointer would indicate that there are no logical channel objects on update channel list 310.

Logical channel objects are placed on update channel list 310 for one or more of three reasons: (1) to fade in a sound, (2) to fade out a sound, or (3) to update the position of a logical channel tied to a moving model. Thus, if the TEMP pointer has a non-zero value, the logical channel object to which TEMP points is examined to determine the reason(s) it is on update channel list 310. Routines then are executed as necessary, and as discussed below, to update the status of the sound channel allocated to the logical channel object.

Assuming that TEMP is not zero, meaning that the routine is not at the end of update channel list 310, the program of FIG. 6 advances to step 608. At step 608, the "fade rate" parameter of the logical channel object to which TEMP points is checked to determine whether the volume of a sound playing on the channel is to be increased or decreased by an incremental amount as part of an ongoing process (i.e. a process extending over multiple iterations of the main loop) which fades the sound in or out. A fade rate value greater than 0 indicates that a fade-in is in progress, a fade rate value of less than 0 indicates that a fade-out is in progress, and a fade rate value equal to 0 indicates that no fade is in progress.

If a non-zero fade rate value is indicated, the indicated value (positive or negative) is added to the value of the level parameter of the logical channel object. The level value is then compared to a predetermined maximum value (if the fade rate is a positive value) or to a predetermined minimum value (if the fade rate is a negative value). If the level value exceeds the maximum value, or is less than the minimum value, the level value is set to the compared maximum or minimum value and the fade rate value is set to 0. A MIDI command identifying the physical sound channel to which the logical channel object is allocated and the new level value is then sent to sound generator 104 to change the volume of the identified physical sound channel to the calculated or identified level.

Next, at step 610, a determination is made whether the physical sound channel allocated to the logical channel object has been tied to a moving model and, if so, the current position of the model in the virtual world is also determined to provide updated position information to the physical sound channel. This is accomplished by examining the MODEL POINTER parameter of the logical channel object (e.g., 306) which, if it has a non-zero value, points to a model declaration (e.g., 304) on a list of active models. If MODEL POINTER is non-zero, a function is called at step 612 to read the current position data x, y, z of the model relative to the fixed coordinate system of the virtual world from model declaration 304 and to store the read data in channel-position array 309 maintained in the memory of master controller 102, at the location in the array assigned to the channel of spatial sound processor 112 allocated to the logical channel object.

Following this, a function is called to calculate a simulated Doppler shift for each logical channel object having a non-zero MODEL POINTER relative to the position and movement of the guest's eyepoint in the virtual world. This is accomplished by first determining for each logical channel, at step 613 whether the channel is making a noise permitted to be pitch shifted. If so, the simulated Doppler shift for the channel is calculated at step 614. Otherwise, the program advances to step 616.

If MODEL POINTER is zero, indicating that the physical sound channel allocated to the logical channel object has not been tied to a moving model, the logical channel object is deleted from update channel list 310 at step 616 unless its fade rate parameter has a non-zero value. Then, at step 618, the TEMP pointer is incremented to point to the next logical channel object on update channel list 310, or is reset to a zero value if there are no more no objects on the list. In this manner, steps 608, 610, 612, 613, 614 and 616 are performed for each logical channel object on update channel list 310.

When looping is complete (i.e., the TEMP pointer has a zero value), program flow advances from step 606 to step 620. At this step, the position data in channel-position array 309 for each channel of the spatial sound processor is transformed, first from Cartesian x, y, z position data defined relative to the fixed coordinate system of the virtual world to x, y, z Cartesian position data defined relative to the position and orientation of the viewer's head, and then from there to polar (azimuth, elevation, range) coordinates. Although conventional spatial sound processors, such as the Convolvotron, may accept position data in either Cartesian (x, y, z) or polar coordinates, it is preferable to be able to scale the range of the spatial sound processor and, thus, preferable to use a polar coordinate system when providing position data to the spatial sound processor.

The first transformation is accomplished by subtracting the x, y and z position coordinates of the viewer's viewpoint in the virtual world (as updated by step 602) from the respective x, y and z position coordinates of the channel to derive a position vector having components dx, dy, dz. Then, a matrix operation is performed using the yaw, pitch and roll data of the viewer's viewpoint in the virtual world to rotate the vector in accordance with the orientation of the viewer's head and to translate the dx, dy, dz vector into a head-relative coordinate system.

Conversion of the "head relative" dx, dy, dz vector to polar coordinates is accomplished by executing an algorithm which extracts relative azimuth, elevation and range values from the values of dx, dy and dz. When calculating range, the algorithm multiplies the range value for the dx, dy, dz vector by a scaling factor at step 622 to map the range of volumes in the virtual world to the volume range capable of being handled by the spatial sound processor.

After calculating elevation, azimuth and range data for each channel of the spatial sound processor, master controller 102 at step 624 sends the position data to spatial sound processor 112. This completes the UPDATE SOUNDS routine, and master controller 102 returns to the main loop at step 626.

Figure 7:
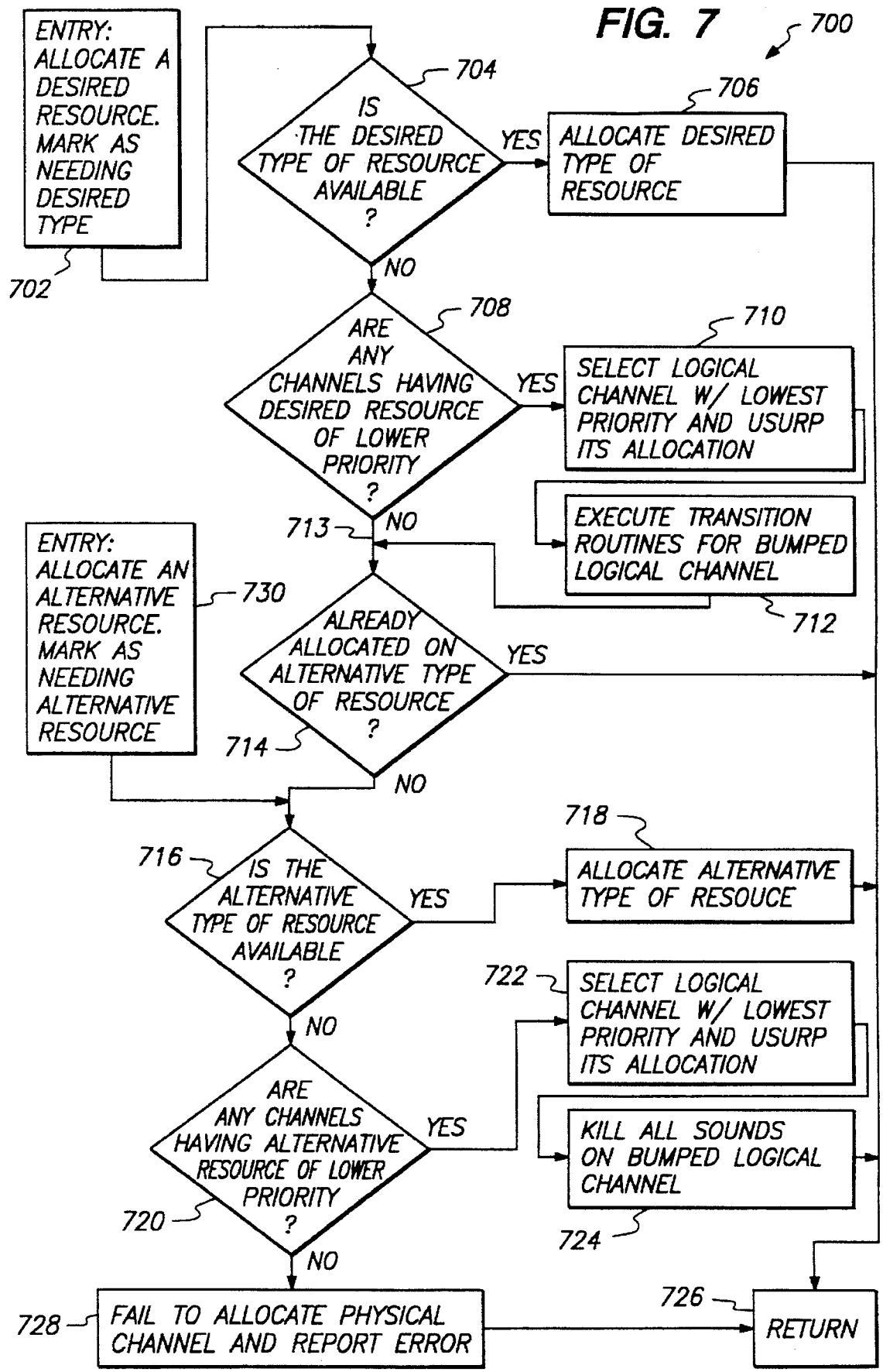
FIG. 7 shows a flowchart of the steps of an exemplary method for prioritized allocation of resources of the sound system of FIG. 1 in accordance with principles of the present invention.

In accordance with another aspect of the present invention, the sound system scheduling routines exemplified by FIGS. 4 and 5 can be modified to allocate sound system resources in a prioritized manner such that important sounds are more likely to be played when sound system resources are in high demand, and such that important sounds are more likely to be played in a desired manner (e.g., delivered by a channel of spatial sound processor 112). FIG. 7 illustrates an exemplary flow chart 700 of steps executed by master controller 102 in allocating resources of sound system 100 according to priority values assigned to logical channel objects. More particularly, flow chart 700 illustrates steps taken by master controller 102 in executing a script instruction "TIE o. TO m. WITH priority", where "o." identifies a logic channel object, "m." identifies a model declaration and "priority" identifies a priority value for the logical channel request. As will be discussed below, master controller 102 may also enter this routine at different points upon a command "SAY s. ON o.", where "s." identifies a sound, to re-execute a previously unsuccessful request for allocation of a desired or alternative resource. In flow chart 700 the resources to be allocated are referred to generically as "desired" and "alternative" resources to illustrate that the techniques of the present invention can be used to schedule and allocate with priority any suitable type of sound system resource.

At step 702, master controller 102 determines that the script instruction seeks to allocate a particular desired type of sound system resource (e.g., a localized physical sound channel) to logical channel object o., and marks the logical channel object o. as needing that particular type of sound system resource by writing an appropriate name or other value into the "output channel type" parameter or a similar parameter of logical channel object o. (but without a channel #). Should the desired allocation not be successfully satisfied, this marking will operate as a flag to notify master controller that upon execution of a subsequent "say" command for logical channel object o., an identical allocation request should be executed. Master controller 102 also writes the priority value specified in the instruction into a priority parameter of logical channel object o. (see 206 of FIG. 2). Each logical channel object may have a default priority value, such that a "tie" command which does not specify a priority value is interpreted as specifying the default value.

Master controller 102 then determines at step 704 whether the desired resource is available by checking channel-in-use array 308 or a similar array indicative of whether the resource is in use. If the desired resource is available, master controller 102 allocates the desired resource to logical channel object o. and returns to the script at step 706.

If the desired resource is not available, master controller 102 examines the priority values of the logical channel objects to which the desired resource is presently assigned at step 708 to determine which, if any, of the logical channel objects presently assigned the desired resource has a lower priority value than the priority value specified in the "tie" instruction for logical channel object o. If any logical channel object presently assigned the desired resource has a lower priority than logical channel object o., master controller 102 proceeds to step 710 at which it selects the logical channel object with the lowest priority value and re-allocates its assigned resource to logical channel object o.

After being "bumped," the newly disenfranchised logical sound channel object becomes the subject of the search for an available resource as the allocation process continues. Assuming that alternative resources are provided in the sound system, such as ambient physical sound channels, master controller 102 proceeds to steps for allocating an alternative resource for the "bumped" logical channel object. At step 712 master controller 102 may execute one or more routines to smooth the transition from one type of resource to another. For example, in the case that a logical channel object is bumped from a spatial sound processor channel to an ambient channel, a dynamic attenuation routine can be called for the bumped logical channel object. The dynamic attenuation routine places the logical channel object on update channel list 310 so that calls to the UPDATE SOUNDS routine will cause master controller 102 to evaluate the relative distance in the virtual world between the viewer and the sound location and to calculate, then institute, an attenuation in volume that would significantly match that otherwise provided by spatial sound processor 112. The dynamic attenuation routine thus prevents sudden, drastic shifts in volume that might be caused by a change in the physical sound channel assigned to the logical sound channel object.

After executing such transitional routines at step 712, master controller 102 then returns to point 713 in the program, which is also reached if no logical channel object having a priority lower than logical channel object o. is found at step 708 (though in that case with the original logical sound channel object o.). Master controller 102 determines at step 714 whether to proceed to steps for allocating an alternative resource by checking whether the logical channel object was previously allocated an alternative resource. For example, master controller 102 may examine the "output channel type,#" parameter of the logical channel object to determine if the logical channel object has already been allocated an ambient channel. This determination is pertinent in instances where, as previously mentioned, master controller 102 enters routine 700 following a "say" command to re-execute a previously unsuccessful request for allocation of a desired resource (see discussion below for further explanation).

If no alternative resource is allocated to the logical channel object, master controller 102 next determines at step 716 whether an alternative resource is available. This determination is made by examining the entries of channel-in-use array 308 corresponding to the alternative resource (e.g., to ambient channels) or a similar array indicative of whether the alternative resource is in use. If the alternative resource is available, master controller allocates the alternative resource at step 718. Otherwise, at step 720 master controller 102 examines the priority values of logical channels to which alternative resources are presently allocated and, if any having a lower priority than the requesting logical channel object is found, selects the lowest priority logical channel object at step 722 and re-allocates its assigned resource to the requesting logical channel object. At step 724 all sounds playing on the "bumped" logical channel are terminated and the routine returns to the script at step 726.

If no alternative resources are available and no alternative resource is allocated to a logical object having a lower priority than logical channel object o., then master controller 102 denies logical channel object o. any physical sound channel at step 728 and reports an error to the system monitor. Master controller 102 then returns to the script at step 726.

Master controller 102 may enter routine 700 at different points during execution of a "say" command to re-execute previously unsuccessful allocation requests. For example, in the case that a desired resource is not allocated to a logical channel object o. responsive to a "tie" command, but instead the logical channel is allocated an alternative resource or no resource at all, an identical allocation request can be executed responsive to a subsequent "SAY s. ON o." command. In this case master controller 102 would enter routine 700 at step 702. The desired resource may have become available in the interim period between execution of the "tie" and "say" commands.

A script may also contain an instruction, analogous to the "tie" command, to allocate an alternative resource to a logical channel object. Execution of such an instruction may be accomplished by entering routine 700 at step 730, at which step master controller 102 marks the logical channel object as needing an alternative resource. For example, master controller 102 may specify an un-numbered ambient channel in the "output channel type,#" parameter of the logical channel object. If the allocation request is unsuccessful, this parameter remains un-numbered and acts as a flag to master controller 102. Upon execution of a subsequent "say" command for the logical channel, master controller 102 re-executes the allocation request by entering routine 700 at step 702.

Using the above techniques, various levels of prioritization can be achieved. For example, logical channel objects can be assigned initial priorities that govern the allocation process throughout. Alternatively, these priorities can be selectively modified with instructions such as a "TIE o. TO m. WITH priority" to temporarily provide a particular logical channel object with a higher or lower priority for saying a particular sound or for giving a particular virtual sound source a different priority throughout a particular scene. The prioritization scheme, like the scheduling scheme of the present invention, is thus flexible, and can respond in real time to viewer actions.

Moreover, the priority values of logical channel objects can be adjusted by master controller 102 algorithmically. For example, as the viewer moves through the virtual world, master controller 102 can execute a routine to calculate the relative distances of sound sources to the viewer and can advance the priorities of sound sources closest to the viewer while lowering the priorities of sound sources farther away. This can be accomplished, for example, by the UPDATE SOUNDS routine.

As has been shown, the scheduling and prioritized allocation principles of the present invention can be generalized and extended for use in allocating any type of resource within a virtual world sound system. For example, the present invention can be used to prioritize the allocation of channels of sound generator 104, using either priority values assigned to the logical channel objects or priority values assigned to the sounds themselves. The latter can be specified initially in sound array 200, and in either case the priority values can be adjusted by script instructions such as a command to "SAY s. ON o. WITH priority."

Thus, it is seen that flexible methods and systems for reproducing sounds in an interactive virtual world environment are provided. It will be appreciated by those skilled in the art that the present invention can be practiced and implemented by other than the described embodiments, which are presented for purposes of illustration and not of limitation, and the present invention is limited only by the claims which follow:

What is claimed is:

1. A method for delivering sounds in a virtual three-dimensional auditory environment complementing a virtual three-dimensional graphic world rendered by a computer graphic system, the rendition capable of being displayed to a viewer from viewpoints having specific positions and orientations within the virtual world, and said sounds being delivered to said viewer using a sound reproduction system having a programmable controller and sound channels of localized and non-localized types, the method comprising the steps of:

A. storing data representative of a plurality of sounds in the virtual world;

B. generating logical sound channel objects corresponding to virtual sound sources in the virtual world, said logical sound channel objects having first parameters for associating sound channels with said virtual sound sources, and second parameters for associating graphic objects in the virtual world with said virtual sound sources;

C. programming said controller with a script of events in the virtual world, said script comprising instructions to associate specified ones of said virtual sound sources with specified graphic objects or specified positions in the virtual world, said association differentiating localized virtual sound sources from non-localized virtual sound sources, and instructions directing specified ones of said sounds to be produced by specified ones of said localized and non-localized virtual sound sources;

D. programming said controller to respond to an instruction to associate a specified virtual sound source with a specified graphic object or position, said response including the steps of:
      (a) determining whether a localized sound channel is allocated to the logical sound channel object corresponding to the specified virtual sound source;
      (b) responsive to a determination that a localized sound channel is not allocated to the corresponding logical sound channel object, (i) attempting to allocate to the corresponding logical sound channel object a localized sound channel based on the availability of said localized type of sound channel; (ii) if said localized type of sound channel is unavailable, attempting to allocate a non-localized sound channel to the corresponding logical sound channel object based on the availability of said non-localized type of sound channel; and (iii) if a sound channel is available for allocation to the corresponding logical sound channel object, assigning a value identifying the sound channel to the first parameter of the corresponding logical sound channel object, thereby associating the specified virtual sound source with the allocated sound channel; and (c) if the allocated sound channel is of the localized type, assigning a position to the allocated sound channel, said assigning of a position including, where said position is for a graphic object, using the second parameter of the corresponding logical sound channel object to associate the specified virtual sound source with the graphic object; and E. programming said controller to respond to an instruction directing a specified virtual sound source to produce a specified sound, said response including the steps of:

(a) determining whether a sound channel is allocated to the logical sound channel object corresponding to said specified virtual sound source;

(b) responsive to a determination that a sound channel is not allocated to the corresponding logical sound channel object, (i) attempting to allocate to the corresponding logical sound channel object a non-localized sound channel based on the availability of said non-localized type of sound channel, and (ii) if a non-localized sound channel is available for allocation, assigning a value identifying the sound channel to the first parameter of the corresponding logical sound channel object, thereby associating the specified virtual sound source with the allocated sound channel; and (c) if a sound channel is allocated to the logical sound channel object corresponding to the specified virtual sound source, processing the data representative of the specified sound to produce a signal representative of the specified sound and manipulating the sound system to deliver the specified sound to the viewer using the allocated sound channel and the signal representative of the specified sound.

2. The method of claim 1 wherein the virtual world rendered by the computer graphic system is interactive, and wherein at least one of said instructions directing specified ones of said sounds to be produced by specified ones of said localized and non-localized virtual sound sources is conditioned on a predetermined action of the viewer.

3. The method of claims 1 or 2, wherein said controller associates a specified virtual sound source with a specified graphic object, and wherein the method further comprises the steps of:

storing data for each of the plurality of sounds indicative of an absolute volume of that sound and a relative volume of that sound in the virtual world;

storing data indicative of distance between the viewer and the specified graphic object; and when processing data representative of a sound for the virtual sound source associated with the specified graphic object to produce a signal representative of that sound, the signal having a volume, adjusting the volume of the signal based on the relative and absolute volumes of the sound and the distance between the viewer and the specified graphic object.

4. A method for delivering sounds in a virtual three-dimensional auditory environment complementing a virtual three-dimensional graphic world rendered by a computer graphic system, the rendition capable of being displayed to a viewer from viewpoints having specific positions and orientations within the virtual world, and said sounds being delivered to said viewer using a sound reproduction system having a programmable controller and sound channels of localized and non-localized types, the method comprising the steps of:

A. storing data representative of the sounds;

B. generating logical sound channel objects corresponding to virtual sound sources in the virtual world, said logical sound channel objects having first parameters for associating sound channels with said virtual sound sources, second parameters for associating graphic objects in the virtual world with said virtual sound sources, and third parameters for associating assigned priority values with said virtual sound sources;

C. assigning priorities to the logical sound channel objects;

D. programming said controller with a script of events in the virtual world, said script comprising instructions to associate specified ones of said virtual sound sources with specified graphic objects or specified positions in the virtual world, said association differentiating localized virtual sound sources from non-localized virtual sound sources, and instructions directing specified ones of said sounds to be produced by specified ones of said localized and non-localized virtual sound sources, at least one of said instructions specifying a priority value;

E. programming said controller to respond to an instruction to associate a specified virtual sound source with a specified graphic object or position, said response including the steps of:

(a) determining whether a localized sound channel is allocated to the logical sound channel object corresponding to the specified virtual sound source;

(b) responsive to a determination that a localized sound channel is not allocated to the corresponding logical sound channel object, (i) attempting to allocate to the corresponding logical sound channel object a localized sound channel based on the availability of said localized type of sound channel and the priority of the corresponding logical sound channel object and the assigned priorities of logical sound channel objects to which localized sound channels are associated, the priority of the corresponding logical sound object being its assigned priority as modified by any priority value specified in the instruction; (ii) if said localized type of sound channel is unavailable, attempting to allocate a non-localized sound channel to the corresponding logical sound channel object based on the availability of said non-localized type of sound channel and the priority of the corresponding logical sound channel object and the assigned priorities of logical sound channel objects to which non-localized sound channels are associated, the priority of the corresponding logical sound object being its assigned priority as modified by any priority value specified in the instruction; and (iii) if a sound channel is available for allocation to the corresponding logical sound channel object, assigning a value identifying the sound channel to the first parameter of the corresponding logical sound channel object, thereby associating the specified virtual sound source with the allocated sound channel; and (c) if the allocated sound channel is of the localized type, assigning a position to the allocated sound channel, said assigning of a position including, where said position is for a graphic object, using the second parameter of the corresponding logical sound channel object to associate the specified virtual sound source with the graphic object; and F. programming said controller to respond to an instruction directing a specified virtual sound source to produce a specified sound, said response including the steps of:

(a) determining whether a sound channel is allocated to the logical sound channel object corresponding to said specified virtual sound source;

(b) responsive to a determination that a sound channel is not allocated to the corresponding logical sound channel object, (i) attempting to allocate to the corresponding logical sound channel object a non-localized sound channel based on the availability of said non-localized type of sound channel and the priority of the corresponding logical sound channel object and the assigned priorities of logical sound channel objects to which non-localized sound channels are allocated, the priority of the corresponding logical sound channel object being its assigned priority as modified by any priority value specified in the instruction and (ii) if a non-localized sound channel is available for allocation, assigning a value identifying the sound channel to the first parameter of the corresponding logical sound channel object, thereby associating the specified virtual sound source with the allocated sound channel; and (c) if a sound channel is allocated to the logical sound channel object corresponding to the specified virtual sound source, processing the data representative of the specified sound to produce a signal representative of the specified sound and manipulating the sound system to deliver the specified sound to the viewer using the allocated sound channel and the signal representative of the specified sound.

5. In a computer graphic system which includes a sound reproduction system for providing a virtual three-dimensional auditory environment complementing a virtual three-dimensional graphic world rendered by said computer graphic system, the rendition being displayed to a viewer from viewpoints having specific positions and orientations in the virtual world, the sound reproduction system having a programmable controller and (1) a first number of localized channels each coupled to spatial sound processing means for delivering a sound emanating from a graphic object such that the sound contains at least one localization cue corresponding to the three-dimensional position of the object in the virtual world and (2) a second number of non-localized channels for delivering sounds emanating from graphic objects, a method for allocating a channel to a graphic object, comprising the steps of:

A. maintaining in a memory of the computer graphic system a first data structure that indicates for each channel of the first and second numbers whether that channel is available for delivering a sound;

B. storing data representative of a plurality of sounds in the virtual world;

C. generating logical sound channel objects corresponding to virtual sound sources in the virtual world, said logical sound channel objects having first parameters for associating sound channels with said virtual sound sources, and second parameters for associating graphic objects in the virtual world with said virtual sound sources;

D. programming said controller with a script of events in the virtual world, said script comprising instructions to associate specified ones of said virtual sound sources with specified graphic objects or specified positions in the virtual world, said association differentiating localized virtual sound sources from non-localized virtual sound sources, and instructions directing specified ones of said sounds to be produced by specified ones of said localized and non-localized virtual sound sources;

E. programming said controller to respond to an instruction to associate a specified virtual sound source with a specified graphic object or position, said response including the steps of:

(a) determining whether a localized sound channel is allocated to the logical sound channel object corresponding to the specified virtual sound source;

(b) responsive to a determination that a localized sound channel is not allocated to the corresponding logical sound channel object, (i) attempting to allocate to the corresponding logical sound channel object a localized sound channel based on the availability of said localized type of sound channel; (ii) if said localized type of sound channel is unavailable, attempting to allocate a non-localized sound channel to the corresponding logical sound channel object based on the availability of said non-localized type of sound channel; and (iii) if a sound channel is available for allocation to the corresponding logical sound channel object, assigning a value identifying the sound channel to the first parameter of the corresponding logical sound channel object, thereby associating the specified virtual sound source with the allocated sound channel, and storing data in the first data structure which indicates the allocated sound channel has become unavailable; and (c) if the allocated sound channel is of the localized type, assigning a position to the allocated sound channel, said assigning of a position including, where said position is for a graphic object, using the second parameter of the corresponding logical sound channel object to associate the specified virtual sound source with the graphic object, and storing data in a second data structure maintained in a memory of the computer graphic system which associates the position of the graphic object in the virtual world with the allocated sound channel; and F. programming said controller to respond to an instruction directing a specified virtual sound source to produce a specified sound, said response including the steps of:

(a) determining whether a sound channel is allocated to the logical sound channel object corresponding to said specified virtual sound source;

(b) responsive to a determination that a sound channel is not allocated to the corresponding logical sound channel object, (i) attempting to allocate to the corresponding logical sound channel object a non-localized sound channel based on the availability of said non-localized type of sound channel, and (ii) if a non-localized sound channel is available for allocation, assigning a value identifying the sound channel to the first parameter of the corresponding logical sound channel object, thereby associating the specified virtual sound source with the allocated sound channel and storing data in the first data structure which indicates the allocated sound channel has become unavailable; and (c) if a sound channel is allocated to the logical sound channel object corresponding to the specified virtual sound source, processing the data representative of the specified sound to produce a signal representative of the specified sound and manipulating the sound system to deliver the specified sound to the viewer using the allocated sound channel and the signal representative of the specified sound; and de-allocating a channel after a sound emanating from an object is delivered by that channel, de-allocation including the step of storing data in the first data structure which indicates the channel has become available.

6. In a computer graphic system for rendering a number of graphic objects each situated at a position in a three-dimensional virtual world, the rendition being displayed to a viewer from viewpoints having specific positions and orientations in the virtual world, the system having a programmable controller and (1) a first number of localized channels for delivering sounds emanating from graphic objects such that the sounds contain at least one localization cue corresponding to the three-dimensional positions of the objects in the virtual world and (2) a second number of non-localized channels for delivering non-localized sounds, a method for delivering localized and non-localized sounds to the viewer comprising the steps of:

A. storing data representative of a plurality of sounds in the virtual world;

B. generating logical sound channel objects corresponding to virtual sound sources in the virtual world, said logical sound channel objects having first parameters for associating sound channels with said virtual sound sources, and second parameters for associating graphic objects in the virtual world with said virtual sound sources;

C. programing said controller with a script of events in the virtual world, said script comprising instructions to associate specified ones of said virtual sound sources with specified graphic objects or specified positions in the virtual world, said association differentiating localized virtual sound sources from non-localized virtual sound sources, and instructions directing specified ones of said sounds to be produced by specified ones of said localized and non-localized virtual sound sources;

D. programming said controller to respond to an instruction to associate a specified virtual sound source with a specified graphic object or position, said response including the steps of:

(a) determining whether a localized sound channel is allocated to the logical sound channel object corresponding to the specified virtual sound source;

(b) responsive to a determination that a localized sound channel is not allocated to the corresponding logical sound channel object, (i) attempting to allocate to the corresponding logical sound channel object a localized sound channel based on the availability of said localized type of sound channel; (ii) if said localized type of sound channel is unavailable, identifying the corresponding logical sound channel object as needing a localized sound channel and attempting to allocate a non-localized sound channel to the corresponding logical sound channel object based on the availability of said non-localized type of sound channel; and (iii) if a sound channel is available for allocation to the corresponding logical sound channel object, assigning a value identifying the sound channel to the first parameter of the corresponding logical sound channel object, thereby associating the specified virtual sound source with the allocated sound channel; and (c) if the allocated sound channel is of the localized type, assigning a position to the allocated sound channel, said assigning of a position including, where said position is for a graphic object, using the second parameter of the corresponding logical sound channel object to associate the specified virtual sound source with the graphic object; and E. programming said controller to respond to an instruction directing a specified virtual sound source to produce a specified sound, said response including the steps of:

(a) determining whether the logical sound object corresponding to the specified virtual sound source has been identified as needing a localized sound channel, and if so, repeating steps 4(b) and 4(c);

(b) if the corresponding logical sound channel object has not been identified as needing a localized sound channel, (i) determining whether a sound channel is allocated to the logical sound channel object corresponding to said specified virtual sound source; and (ii) responsive to a determination that a sound channel is not allocated to the corresponding logical sound channel object, attempting to allocate to the corresponding logical sound channel object a non-localized sound channel based on the availability of said non-localized type of sound channel, and if a non-localized sound channel is available for allocation, assigning a value identifying the sound channel to the first parameter of the corresponding logical sound channel object, thereby associating the specified virtual sound source with the allocated sound channel; and (c) if a sound channel is allocated to the logical sound channel object corresponding to the specified virtual sound source, processing the data representative of the specified sound to produce a signal representative of the specified sound and manipulating the sound system to deliver the specified sound to the viewer using the allocated sound channel and the signal representative of the specified sound.

7. A sound system for delivering sounds from virtual sound sources in a virtual three-dimensional auditory environment complementing a virtual world rendered by a computer graphic system, the rendition capable of being displayed to a viewer from viewpoints having specific positions and orientations within the virtual world, and said sound system having a programmable controller and sound channels of different non-interchangeable types, said sound channels of different types being non-interchangeable in that they deliver said sounds with perceptibly different psychoacoustic properties depending on the particular type of the sound channel, the sound system comprising:

means for storing data representative of a plurality of sounds in the virtual world;

means for instructing said programmable controller to associate specified virtual sound sources with the virtual world rendered by the computer graphic system, said association determining the psychoacoustic properties intended for sounds delivered from each specified virtual sound source;

means for requesting allocation to each specified virtual sound source a sound channel of the particular type that delivers sounds with the psychoacoustic properties intended for that specified virtual sound source;

means responsive to the allocation request for attempting to allocate, to each specified virtual sound source, a sound channel of the particular type that delivers sounds with the psychoacoustic properties intended for that specified virtual sound source, based on the availability of sound channels of said particular type and, if said particular type of sound channel that delivers sounds with the psychoacoustic properties intended for that specified virtual sound source is unavailable, attempting to allocate to the specified virtual sound source a sound channel of a different non-interchangeable type based on the availability of sound channels of said different non-interchangeable type;

means for instructing said programmable controller to deliver a specified sound from a selected one of said specified virtual sound sources;

means for processing the data representative of the specified sound to produce a signal representative of the specified sound; and means for manipulating the sound system to deliver the specified sound using the sound channel allocated to said selected virtual sound source and the signal representative of the specified sound.

8. The sound system of claim 7 wherein the virtual world rendered by the computer graphic system is interactive, and wherein the sound system further comprises:

means for detecting an interaction between the viewer and the virtual world; and means responsive to the detected interaction for specifying a second one of the plurality of sounds to be delivered from said selected virtual sound source and processing the data representative of the second specified sound to produce a signal representative of the second specified sound and delivering the second specified sound using the allocated sound channel and the signal representative of the second specified sound.

9. The sound system of claims 7 or 8, further comprising:

means for storing data for each of the plurality of sounds indicative of an absolute volume of that sound and a relative volume of that sound in the virtual world;

means for storing data indicative of distance between the viewer and an object in the virtual world; and wherein said means for processing the data representative of a specified sound to produce a signal representative of that sound includes means for adjusting a volume of the signal based on the relative and absolute volumes of the sound and the distance between the viewer and the object.

10. A sound system for delivering sounds emanating from objects situated at specific three-dimensional positions in a virtual world rendered by a computer graphic system, the rendition capable of being displayed to a viewer from viewpoints having specific positions and orientations within the virtual world, and the computer graphic system having localized and non-localized sound channels for delivering sounds, the sound system comprising:

means for storing data representative of the sounds;

means for assigning priorities to the objects;

means for requesting that sound channels of the localized type be allocated to objects;

means responsive to the sound delivery allocation requests for allocating sound channels of the localized and non-localized types to the objects based on the availability of the localized type of sound channel and the priorities of the objects;

means for processing the data representative of the sounds to produce signals representative of the sounds; and means for manipulating the computer graphic system to deliver the sounds using the allocated sound channels and the signals; and means for selectively modifying the priority of an object in connection with a particular sound delivery allocation request to provide dynamic allocation of sound channels.

11. In a computer graphic system for rendering a number of objects each situated at a position in a three-dimensional virtual world, the rendition being displayed to a viewer from viewpoints having specific positions and orientations in the virtual world, the system having (1) a first number of channels coupled to spatial sound processing means for delivering a sound emanating from an object such that the sound contains at least one localization cue corresponding to the three-dimensional position of the object in the virtual world and (2) a second number of other channels for delivering non-localized sounds, a system for allocating a channel to an object comprising:

means for maintaining in a memory of the computer graphic system a first data structure that indicates for each channel of the first and second numbers whether that channel is available for delivering a sound;

means for determining for an object whether one of the first number of channels is available for delivering the sound emanating from the object;

means responsive to a determination that one of the first number of channels is available for allocating the channel to the object, an allocation of a channel of the first number including the steps of storing data in the first data structure which indicates the allocated channel has become unavailable, and storing data in a second data structure maintained in a memory of the computer graphic system which associates the position of the object in the virtual world with the allocated channel;

means, responsive to a determination that none of the first number of channels is available, for attempting to allocate one of the second number of channels to the object, an allocation of a channel of the second number including the step of storing data in the first data structure which indicates the allocated channel has become unavailable; and means for de-allocating a channel after a sound emanating from an object is delivered by that channel.

12. In a computer graphic system for rendering a number of objects each situated at a position in a three-dimensional virtual world, the rendition being displayed to a viewer from viewpoints having specific positions and orientations in the virtual world, the system having (1) a first number of channels coupled to spatial sound processing means for delivering a sound emanating from an object such that the sound contains at least one localization cue corresponding to the three-dimensional position of the object in the virtual world and (2) a second number of other channels for delivering sounds emanating from objects, wherein the second number of channels deliver sounds that are not localized to the three-dimensional positions of objects in the virtual world, a system for allocating a channel to an object comprising:

means for maintaining in a memory of the computer graphic system a first data structure that indicates for each channel of the first and second numbers whether that channel is available for delivering a sound;

means for determining for an object whether one of the first number of channels is available for delivering the sound emanating from the object;

means responsive to a determination that one of the first number of channels is available for allocating the channel to the object, an allocation of a channel of the first number including the steps of storing data in the first data structure which indicates the allocated channel has become unavailable, and storing data in a second data structure maintained in a memory of the computer graphic system which associates the position of the object in the virtual world with the allocated channel;

means responsive to a determination that none of the first number of channels is available, for attempting to allocate one of the second number of channels to the object, an allocation of a channel of the second number including the step of storing data in the first data structure which indicates the allocated channel has become unavailable; and means for de-allocating a channel after a sound emanating from an object is delivered by that channel.

13. In a computer graphic system for rendering a number of sound-emanating objects each situated at a position in a three-dimensional virtual world, the rendition being displayed to a viewer from viewpoints having specific positions and orientations in the virtual world, the system having (1) a first number of channels coupled to spatial sound processing means for delivering a sound emanating from an object such that the sound contains at least one localization cue corresponding to the three-dimensional position of the object in the virtual world and (2) a second number of other channels for delivering non-localized sounds, a system for allocating channels of the first and second numbers, comprising:

means for determining for each of the objects whether one of the first number of channels is available for delivering the sound emanating from the object;

means responsive to a determination that one of the first number of channels is available for allocating the channel to the object;

means responsive to a determination that none of the first number of channels is available for determining whether one of the second number of other channels is available for delivering the sound; and means responsive to a determination that one of the second number of other channels is available for allocating the channel to the object.

14. In a computer graphic system for rendering a number of prioritized objects each situated at a position in a three-dimensional virtual world, the rendition being displayed to a viewer from a viewpoint having a specific position and orientation in the virtual world, the system having (1) a first number of channels coupled to spatial sound processing mean for delivering a sound emanating from an object such that the sound contains at least one localization cue corresponding to the three-dimensional position of the object in the virtual world, and (2) a second number of other channels for delivering non-localized sounds emanating from objects, a system for allocating channels of the first and second numbers, comprising:

means for determining for each of the objects whether one of the first number of channels is available for delivering the sound emanating from the object or is allocated to another object having a lower priority;

means responsive to a determination that one of the first number of channels is available or is allocated to another object having lower priority for allocating the channel to that object;

means responsive to a determination that none of the first number of channels is available or is allocated to another object having lower priority for attempting to allocate one of the second number of other channels to the object.

15. In a computer graphic system for rendering a number of objects each situated at a position in a three-dimensional virtual world, the rendition being displayed to a viewer from viewpoints having specific positions and orientations in the virtual world, the system having (1) a first number of channels for delivering a sound emanating from an object such that the sound contains at least one localization cue corresponding to the three-dimensional position of the object in the virtual world and (2) a second number of other channels for delivering non-localized sounds emanating from objects, a system for delivering to the viewer the sounds emanating from the objects comprising:

means for determining for each of the objects whether one of the first number of channels is available for delivering the sound emanating from the object;

means responsive to a determination that one of the first number of channels is available for allocating the channel to the object so that the sound of the object will be delivered to the viewer such that the sound contains at least one localization cue corresponding to the three-dimensional position of the object in the virtual world; and means, responsive to a determination that none of the first number of channels is available, for attempting to allocate one of the second number of channels to the object and, upon subsequent execution by the computer graphic system of an instruction for the object to emanate a sound, determining again whether one of the first number of channels is available and allocating any such available channel to the object for delivering the sound.

16. In a computer graphic system for rendering a number of objects each situated at a position in a three-dimensional virtual world, the rendition being displayed to a viewer from viewpoints having specific positions and orientations in the virtual world, the system having (1) a first number of channels for delivering a sound emanating from an object such that the sound contains at least one localization cue corresponding to the three-dimensional position of the object in the virtual world and (2) a second number of other channels for delivering non-localized sounds, a system for allocating channels of the first and second numbers comprising:

means for determining for each of the objects whether one of the first number of channels is available for delivering the sound emanating from the object;

means responsive to a determination that one of the first number of channels is available for allocating the channel to the object;

means responsive to a determination that none of the first number of channels is available for determining whether one of the second number of other channels is available for delivering the sound;

means responsive to a determination that one of the second number of other channels is available for allocating the channel to the object; and means responsive to a determination that none of the second number of channels is available for reporting an error.

17. In a computer graphic system for rendering a number of prioritized objects each situated at a position in a three-dimensional virtual world coupled to spatial sound processing means for delivering a sound emanating from an object such that the sound contains at least one localization cue corresponding to the three-dimensional position of the object in the virtual world, and (2) a second number of other channels for delivering non-localized sounds emanating from objects, a system for allocating channels of the first and second numbers comprising:

means for determining for each of the objects whether one of the first number of channels is available for delivering the sound emanating from the object or is allocated to another object having a lower priority;

means responsive to a determination that one of the first number of channels is available for allocating the channel to the object;

means responsive to a determination that one of the first number of channels is allocated to another object having lower priority, de-allocating a channel of the first number from an object having lower priority, allocating that channel to the object for which allocation is requested, and attempting to allocate a channel of the second number to the object of lower priority;

means, responsive to a determination that none of the first number of channels is available or is allocated to another object having lower priority, for attempting to allocate one of the second number of channels to the object.

\* \* \* \* \*